(12) United States Patent
Hefner, Jr.

(10) Patent No.: US 9,068,039 B2
(45) Date of Patent: Jun. 30, 2015

(54) THERMOSETTABLE COMPOSITIONS AND THERMOSETS THEREFROM

(75) Inventor: Robert E. Hefner, Jr., Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 173 days.

(21) Appl. No.: 13/816,256

(22) PCT Filed: Aug. 31, 2011

(86) PCT No.: PCT/US2011/049840
§ 371 (c)(1),
(2), (4) Date: Feb. 11, 2013

(87) PCT Pub. No.: WO2012/047420
PCT Pub. Date: Apr. 12, 2012

(65) Prior Publication Data
US 2013/0237642 A1 Sep. 12, 2013

Related U.S. Application Data

(60) Provisional application No. 61/388,059, filed on Sep. 30, 2010.

(51) Int. Cl.
| | |
|---|---|
| C08G 59/20 | (2006.01) |
| C08G 59/24 | (2006.01) |
| C08G 59/32 | (2006.01) |
| C08G 59/38 | (2006.01) |
| C08G 59/50 | (2006.01) |
| C08L 63/00 | (2006.01) |
| C09D 163/00 | (2006.01) |
| C09J 163/00 | (2006.01) |
| C08G 59/00 | (2006.01) |
| C08G 59/02 | (2006.01) |
| C08G 59/04 | (2006.01) |
| B32B 27/38 | (2006.01) |

(52) U.S. Cl.
CPC .............. *C08G 59/00* (2013.01); *C08G 59/022* (2013.01); *C08G 59/025* (2013.01); *C08G 59/04* (2013.01); *C08L 63/00* (2013.01)

(58) Field of Classification Search
CPC ...... C08G 59/20; C08G 59/226; C08G 59/24; C08G 59/32; C08G 59/3218; C08G 59/38; C08G 59/50; C08G 59/5006; C08G 59/502; C08L 63/00; C09J 163/00; C09D 163/00
USPC ........... 523/400, 427, 428; 549/514, 516, 541
See application file for complete search history.

(56) References Cited

U.S. PATENT DOCUMENTS

| | | |
|---|---|---|
| 3,256,226 A | 6/1966 | Fekete et al. |
| 3,271,363 A | 9/1966 | Nikles et. al. |
| 3,639,655 A | 2/1972 | Faber |
| 3,864,316 A | 2/1975 | Robinson |
| 4,125,558 A | 11/1978 | Torsi |
| 4,284,574 A | 8/1981 | Bagga |
| 4,373,073 A | 2/1983 | Wojtech et al. |
| 4,417,033 A | 11/1983 | Bowditch |
| 4,544,731 A | 10/1985 | Cavitt et al. |
| 5,128,491 A | 7/1992 | Cheng |
| 5,780,582 A | 7/1998 | Wang et al. |
| 5,959,061 A | 9/1999 | Neumann et al. |
| 6,211,389 B1 | 4/2001 | Dimke |
| 6,410,807 B1 | 6/2002 | Yang et al. |
| 6,677,468 B1 | 1/2004 | Dimke et al. |
| 8,318,834 B2 | 11/2012 | Hefner, Jr. et al. |
| 2002/0161106 A1 | 10/2002 | Anderson |
| 2006/0235183 A1 | 10/2006 | Ogura et al. |
| 2007/0087146 A1 | 4/2007 | Evans et al. |
| 2007/0117938 A1 | 5/2007 | Martz et al. |
| 2007/0281179 A1 | 12/2007 | Ambrose et al. |
| 2011/0039982 A1 | 2/2011 | Hefner, Jr. et al. |
| 2011/0040046 A1 | 2/2011 | Hefner, Jr. et al. |
| 2011/0054056 A1 | 3/2011 | Hefner, Jr. et al. |

FOREIGN PATENT DOCUMENTS

| | | | | |
|---|---|---|---|---|
| EP | 121260 A2 | * | 10/1984 | ............. C08G 59/04 |
| EP | 0253405 A2 | | 1/1988 | |
| EP | 0702042 A1 | | 3/1996 | |
| GB | 1204760 A | | 11/1918 | |
| JP | 2007009158 | | 1/2007 | |
| WO | 9510556 A1 | | 4/1995 | |
| WO | 0001779 A1 | | 1/2000 | |
| WO | 03078512 A1 | | 9/2003 | |
| WO | 2007/078859 A2 | | 7/2007 | |
| WO | 2008045882 A1 | | 4/2008 | |

(Continued)

OTHER PUBLICATIONS

Taira, Kazunari, et al., Journal of the American Chemical Society, Jun. 8, 1984, 7831-7835, V. 106.

(Continued)

*Primary Examiner* — Michael J Feely
(74) *Attorney, Agent, or Firm* — Brooks, Cameron & Huebsch, PLLC

(57) ABSTRACT

A thermosettable (curable) epoxy resin composition including (A) a residual oligomeric product; wherein the residual oligomeric product comprises a polyfunctional aliphatic or cycloaliphatic epoxy resin which has been isolated from an epoxy resin product formed as a result of an epoxidation process comprising the reaction of (i) an aliphatic or cycloaliphatic hydroxyl-containing material with (ii) an epihalohydrin, (iii) a basic-acting substance, (iv) a non-Lewis acid catalyst, and (V) optionally one or more solvents; (B) an epoxy curing material comprising (i) an epoxy resin curing agent, (ii) an epoxy resin catalyst, or both an epoxy resin curing agent (i) and an epoxy resin catalyst (ii); and (C) optionally, an epoxy resin compound other than the aliphatic or cycloaliphatic polyfunctional epoxy resin (A). A thermoset may also be made from the above thermosettable composition.

16 Claims, 2 Drawing Sheets

(56) References Cited

FOREIGN PATENT DOCUMENTS

| WO | 2008045884 A1 | 4/2008 |
| WO | 2008045889 A1 | 4/2008 |
| WO | 2008045894 A1 | 4/2008 |
| WO | 2009/105938 A1 | 9/2009 |
| WO | 2009142898 A1 | 11/2009 |
| WO | 2009142900 A1 | 11/2009 |
| WO | 2009142901 A1 | 11/2009 |
| WO | 2012/044443 A1 | 4/2012 |
| WO | 2012/044455 A1 | 4/2012 |
| WO | 2012/050777 A1 | 4/2012 |
| WO | 2012044458 A1 | 4/2012 |

OTHER PUBLICATIONS

U.S. Appl. No. 61/157,380.
U.S. Appl. No. 61/388,059.
White, S.R., et al, Nature, Autonomic Healing of Polymer Composites, 2001, pp. 409-794.
Dean, J.M., et al., Journal of Polymer Science, Part B: Polymer Physics, 2001, pp. 2996-3010, vol. 39.
PCT US2011050742, International Preliminary Report on Patentability, (2012).
PCTUS2011049840, International Preliminary Report on Patentability, (2013).
PCTUS2011049840, International Search Report, (2012).
PCTUS2011049840, Written Opinion of the International Searching Authority.
PCTUS2011050597, International Search Report, (2012).
PCTUS2011050597, Written Opinion of the International Searching Authority, (2012).
PCTUS2011050613, International Preliminary Report on Patentability, (2013).
PCTUS2011050613, International Search Report and Written Opinion, (2012).
PCTUS2011050742, International Search Report and Written Opinion of the International Searching Authority, (2012).
PCTUS2011051291, International Preliminary Report on Patentability, (2013).
PCTUS2011051291, International Search Report, (2011).
PCTUS2011051291, Written Opinion of the International Searching Authority.
PCTUS2011051482, International Preliminary Report on Patentability, (2013).
PCTUS2011051482, International Search Report and Written Opinion of the International Searching Authority, (2011).
PCTUS2011052236 International Preliminary Report on Patentability, (2013).
PCTUS2011052236 International Search Report and Written Opinion of the International Searching Authority, (2011).
PCTUS2011052672, International Preliminary Report on Patentability, (2013).
PCTUS2011052672, International Search Report, (2011).
PCTUS2011052672, Written Opinion of the International Searching Authority.

* cited by examiner

THERMOSETTABLE COMPOSITIONS AND THERMOSETS THEREFROM

This application is a non-provisional application claiming priority from the U.S. Provisional Patent Application No. 61/388,059, filed on Sep. 30, 2010 entitled "THERMOSETTABLE COMPOSITIONS AND THERMOSETS THEREFROM" the teachings of which are incorporated by reference herein, as if reproduced in full hereinbelow.

BACKGROUND OF THE INVENTION

1. Field of the Invention

The present invention is related to thermosettable compositions made from polyfunctional aliphatic and/or cycloaliphatic epoxy resins and to thermosets made from said thermosettable compositions.

2. Description of Background and Related Art

Epoxidation of aliphatic and cycloaliphatic alcohols is an area of long standing interest, for example as described in EP 0 121 260. Disclosed in EP 0 121 260 are examples of phase transfer catalyzed epoxidation of aliphatic diols, including cyclohexanedimathanol, using epichlorohydrin with quaternary ammonium halide catalysts.

WO2009/142901, incorporated herein by reference, describes an epoxy resin composition prepared from a mixture of cis-, trans-1,3- and 1,4-cyclohexanedimethanols using several epoxidation processes. WO/2009/142901 also discloses examples of preparing various distilled grades of the monoglycidyl ethers and diglycidyl ethers of cis-, trans-1,3- and 1,4-cyclohexanedimethanols, including a high purity (>99 wt %) diglycidyl ether of cis-, trans-1,3- and 1,4-cyclohexanedimethanols.

WO2009/142900, incorporated herein by reference, describes an epoxy resin reactive diluent composition prepared from a mixture of a first epoxy resin comprising an epoxy resin of cis-, trans-1,3- and 1,4-cyclohexanedimethanols and a second epoxy resin comprising one or more epoxy resins other than the first epoxy resin.

When using the prior art chemistry and processes to manufacture aliphatic and cycloaliphatic epoxy resins via epoxidation of aliphatic and cycloaliphatic hydroxyl containing materials with an epihalohydrin, it is difficult if not impossible, to drive to full conversion; and the processes produce significant quantities of oligomeric co-products (as much as 25 weight percent (wt %)-40 wt % of the epoxy resin composition). The components of the epoxy resin may include for example unconverted aliphatic and cycloaliphatic hydroxyl containing material reactant, monoglycidyl ether, diglycidyl ether, oligomeric co-products, and the like. While various methods, such as for example distillation, are operable for removing the desired high purity diglycidyl ether of cis-, trans-1,3- and 1,4-cyclohexanedimethanols from the undesirable oligomeric co-products, no satisfactory solution exists for handling the resulting separated and isolated oligomeric co-products. The solution to date has been to use the as produced mixture of the aliphatic and cycloaliphatic epoxy resins and the oligomeric co-products together as a reactive diluent for other epoxy resins where the oligomeric co-products are simply carried into the total diluent and epoxy resin composition. Problems with this approach include preparing an epoxy resin product having a higher than desirable viscosity induced by the presence of the oligomeric co-products and having a reduced reactivity with curing agents.

In view of the problems with prior art processes, it would be highly desirable to be able to fractionate an aliphatic or cycloaliphatic epoxy resin into monoglycidyl ether, diglycidyl ether, and the like, such that any residual oligomeric co-products fraction can be advantageously utilized to provide novel thermosettable compositions and thermosets based on the residual oligomeric co-products fraction.

SUMMARY OF THE INVENTION

A "residual oligomeric product" herein means an oligomeric fraction which is co-produced during an epoxidation process for producing an aliphatic or cycloaliphatic epoxy resin product; wherein the co-produced oligomeric fraction and the aliphatic or cycloaliphatic epoxy resin product resultant mixture after the epoxidation process is subjected to a subsequent separation process such that the co-produced oligomeric fraction is substantially separated and isolated from the aliphatic or cycloaliphatic epoxy resin product. The separation process can be carried out by a known means such as for example a distillation unit operation. Once the co-produced oligomeric fraction is separated from the aliphatic or cycloaliphatic epoxy resin product, for example by distillation, the resulting separated/isolated oligomeric fraction material, typically the residual bottoms material of a distillation process, comprises the residual oligomeric product useful in the present invention.

One embodiment of the present invention is directed to a thermosettable (curable) epoxy resin composition comprising (A) the residual oligomeric product described above; wherein the residual oligomeric product further comprises a polyfunctional aliphatic or cycloaliphatic epoxy (PACE) resin which has been isolated from an epoxy resin product formed as a result of an epoxidation process. The epoxidation process comprises reacting (i) an aliphatic or cycloaliphatic hydroxyl-containing material; (ii) an epihalohydrin; (iii) a basic-acting substance; in the presence of (iv) a non-Lewis acid catalyst; and (v) optionally, one or more solvents. The thermosettable (curable) epoxy resin composition further comprises (B) an epoxy curing material comprising (i) an epoxy resin curing agent, (ii) an epoxy resin curing catalyst, or both an epoxy resin curing agent (i) and an epoxy resin curing catalyst (ii); and (C) optionally, an epoxy resin compound other than the PACE resin.

Another embodiment of the present invention is directed to a process of partially thermosetting ("B-staging") or completely thermosetting the above thermosettable epoxy resin composition.

A further embodiment of the present invention is directed to a thermosettable epoxy resin prepared by the above process of thermosetting the thermosettable epoxy resin composition.

Still another embodiment of the present invention is directed to a thermoset article prepared using the above thermosettable epoxy resin composition.

The performance provided by a thermoset made from the PACE resin of the present invention, unexpectedly illustrates that a thermosettable composition and thermoset thereof using the PACE resin are well-suited for use as a general thermoset resin in a variety of applications. For example, a thermoset made from a PACE resin isolated from the quaternary ammonium halide catalyzed epoxidation of cis-,trans-1,3- and cis-,trans-1,4-cyclohexanedimethanol is now shown to provide desirable properties which suggest utility in a number of applications. The aliphatic/cycloaliphatic structure inherent to the PACE resin is highly desirable for applications requiring weatherability (e.g. UV resistance, non-chalking behavior); and is expected to additionally impart moisture resistance and even enhanced toughness.

The inherent polyfunctionality of the PACE resin is also expected to be beneficial with respect to moisture and corrosion resistance as well as mechanical properties including toughness. In addition, viscosities of the PACE resin component are significantly lower than that of typical and frequently used diglycidyl ethers of bisphenol A (e.g. D.E.R.™ 331 which has a viscosity of from 11,000-14,000 centipoise (cp) at 25° C.). Also, when the PACE resin is cured, for example, with alkyleneamines, the reactivity and glass transition temperatures are well within the end use range for numerous applications serviced by conventional epoxy resins, while maintaining an all aliphatic/cycloaliphatic thermoset matrix. Resulting clear, unfilled cured castings using the PACE resin are transparent, defect free, and fully cured (e.g. the castings exhibit no residual exothermic cure energy by differential scanning calorimetry (DSC) analysis) in contrast to castings prepared using a high purity diglycidyl ether of cis-,trans-1,3- and cis-,trans-1,4-cyclohexanedimethanol which exhibits significant defects and incomplete curing. Curing with an aromatic diamine allows access to thermoset matrices with glass transition temperatures of greater than or equal to (≥) 100° C.

The thermosettable and thermoset PACE resin compositions of the present invention may be beneficially employed in a wide variety of end uses, such as for example, coatings, especially protective coatings with excellent solvent resistant, moisture resistant, abrasion resistant, and weatherable (e.g., UV resistant, non-chalking) properties.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings. In the accompanying drawings, like reference numerals are used to denote like parts throughout the several drawings.

DETAILED DESCRIPTION OF THE INVENTION

One broad embodiment of the present invention is directed to a thermosettable (curable) epoxy resin composition comprising (A) a PACE resin; and (B) an epoxy curing material comprising (i) an epoxy resin curing agent, (ii) an epoxy resin curing catalyst, or both (i) and (ii). Other optional components, as described herein below, can be added to the above composition comprising components (A) and (B).

The term "polyfunctional aliphatic or cycloaliphatic epoxy resin (PACE resin)", also referred to herein interchangeably as an "oligomeric product or co-product" or a "second oligomeric epoxy resin product or co-product", is used herein to mean a product isolated and separated from a first epoxy resin product; wherein the first epoxy resin product and second oligomeric epoxy resin product or co-product are formed as a result of an epoxidation reaction of (i) an aliphatic or cycloaliphatic hydroxyl containing material, (ii) an epihalohydrin, (iii) a basic-acting substance, (iv) a non-Lewis acid catalyst; and optionally, (v) one or more solvents.

The isolated oligomeric product comprises the product remaining after removal of: (1) "light" components, such as, for example, solvents used in the epoxidation reaction, if any, unreacted epihalohydrin, and co-products such as di(epoxypropyl)ether; (2) unreacted aliphatic or cycloaliphatic hydroxyl containing material, if any; (3) partially epoxidized aliphatic or cycloaliphatic hydroxyl containing material, such as, for example, monoglycidyl ether; and (4) fully epoxidized aliphatic or cycloaliphatic hydroxyl containing material, such as, for example, diglycidyl ether, such that the PACE resin product remaining contains no more than 20 wt % of said fully epoxidized aliphatic or cycloaliphatic hydroxyl containing material (4).

The PACE resin composition of the present invention is produced as a second product stream during the production of a first epoxy resin product stream by epoxidizing an aliphatic or cycloaliphatic hydroxyl containing material, particularly an aliphatic or cycloaliphatic diol such as described in WO2009/142901, incorporated herein by reference. After the epoxidation reaction, the PACE resin composition (second epoxy resin product stream) is separated and isolated from the first epoxy resin product stream.

The first and second epoxy products are formed by epoxidizing (i) an aliphatic or cycloaliphatic hydroxyl containing material with (ii) an epihalohydrin, (iii) a basic-acting substance, (iv) a non-Lewis acid catalyst, and optionally, (v) one or more solvents.

Figure 1:
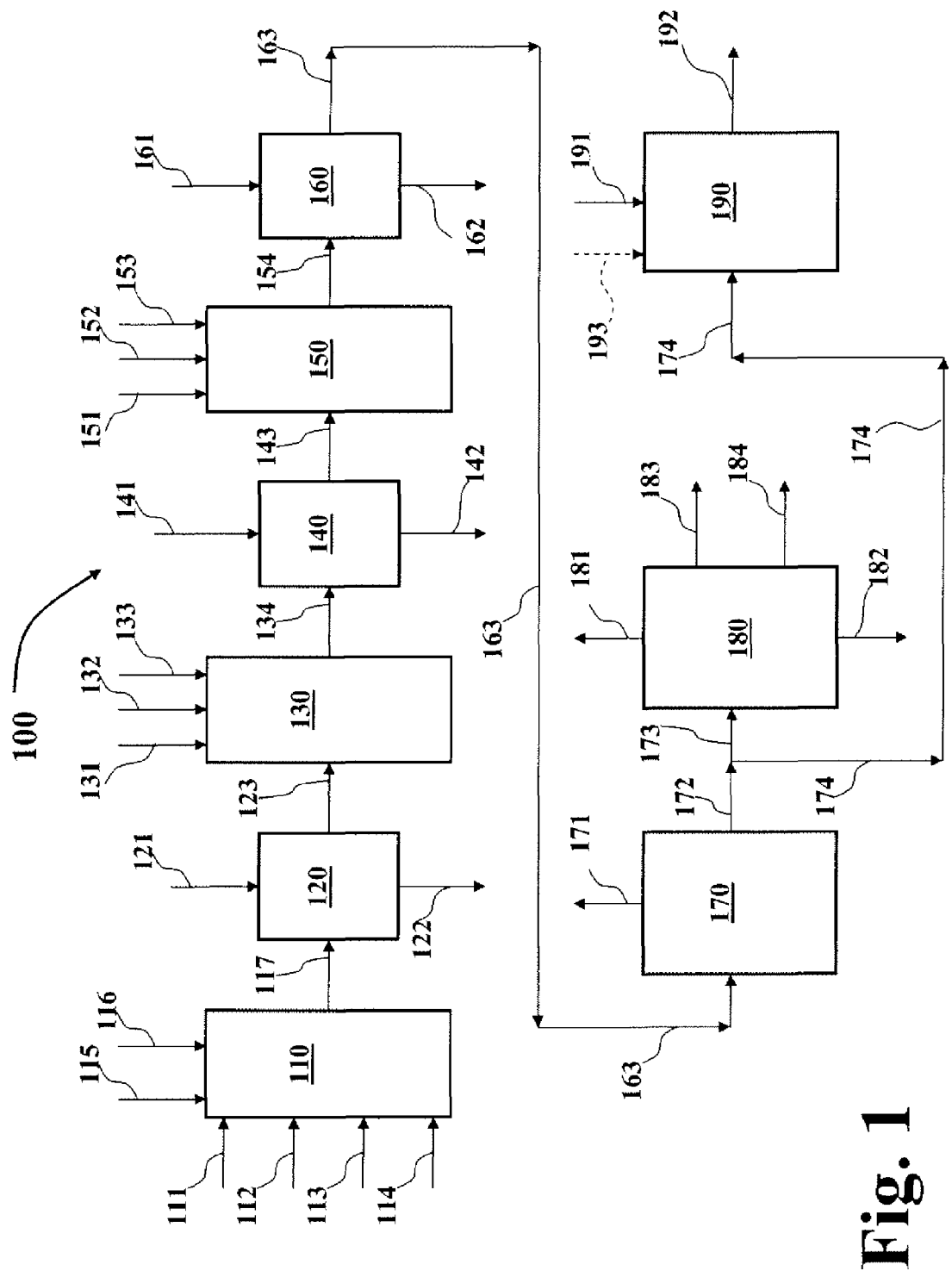
FIG. 1 is a schematic flow diagram showing a process for forming an epoxy resin product.

With reference to FIG. 1, there is shown a general process for manufacturing an epoxy resin composition as described in WO2009/142901, the process generally indicated by reference numeral 100. FIG. 1 shows a series of epoxidation stages, 110, 130, and 150 followed by a washing step after each stage including 120, 140 and 160, respectively. It should be understood that the number of epoxidation stages and washing steps used in present invention process may comprise one, two or more stages and the present invention is not limited to the embodiment shown in FIG. 1 which shows three epoxidation stages and three wash steps. In other embodiments, two or more stages or steps of the present invention may be combined and carried out by one apparatus or by two or more separate apparatuses.

With reference to FIG. 1 again, the process 100 includes an aliphatic or cycloaliphatic hydroxyl containing material feed stream 111, an epihalohydrin feed stream 112, a non-Lewis acid catalyst feed stream 113, and a solvent stream 114 along with a basic-acting substance feed stream 115 and an inert gas such as a nitrogen stream 116 are fed into the first epoxidation reaction stage 110 to carry out a first epoxidation reaction. After the first epoxidation reaction, a resultant first epoxidation product, stream 117 from the first stage 110, is washed with a water stream 121 at the first washing stage 120 as an aqueous waste stream 122 is directed to a waste recovery operation (not shown) or to another operation for further processing. A washed epoxidation product stream 123 exits from the first washing stage 120.

The washed epoxidation product stream 123 from the first washing stage 120 is forwarded to a second epoxidation stage 130 wherein a second non-Lewis acid catalyst stream 131, a second basic-acting substance feed stream 132 and a second inert gas such as a nitrogen stream 133 are fed into the second epoxidation reaction stage 130 to carry out further epoxidation of the washed epoxidation product stream 123 from the first washing stage 120 to form a second epoxidation product stream 134. In an optional embodiment, a second epihalohydrin stream (not shown) and a second solvent stream (not shown) made be fed into the second epoxidation stage 130 if desired. After the second epoxidation reaction, the resultant epoxidation product, stream 134 from the second stage 130, is washed with a water stream 141 at the second washing stage 140 as an aqueous waste stream 142 is directed to a waste recovery operation (not shown) or to another operation for further processing. A washed epoxidation product stream 143 exits from the second washing stage 140.

The washed epoxidation product stream 143 from the second washing stage 140 is forwarded to a third epoxidation stage 150 wherein a third non-Lewis acid catalyst stream 151, a third basic-acting substance feed stream 152 and a third inert gas such as a nitrogen stream 153 are fed into the third epoxidation reaction stage 150 to carry out further epoxidation of the washed epoxidation product stream 143 from the second washing stage 140 to form a third epoxidation product stream 154. In an optional embodiment, a third epihalohydrin stream (not shown) and a third solvent stream (not shown) made be fed into the third epoxidation stage 150 if desired. After the third epoxidation reaction, the resultant third epoxidation product, stream 154 from the third stage 150, is washed with a water stream 161 at the third washing stage 160 as an aqueous waste stream 162 is directed to a waste recovery operation (not shown) or to another operation for further processing. A washed epoxidation product stream 163 exits from the third washing stage 160.

The washed epoxidation product stream 163 from the third washing stage 160 is forwarded to a devolatilization operation 170 to remove any lights 171 from the washed epoxidation product 163 to form a crude epoxidation product stream 172.

Part of the crude epoxidation product stream 172 is forwarded to a fractionation operation 180 as stream 173 wherein a top lights stream 181, a bottoms stream 182, a partially or partially/fully epoxidized aliphatic or cycloaliphatic hydroxyl containing material stream 183, and a fully epoxidized aliphatic or cycloaliphatic hydroxyl containing material stream 184 are produced. The fully epoxidized aliphatic or cycloaliphatic hydroxyl containing material stream 184 is a purified epoxy resin product which can be used in subsequent processes. The bottoms stream 182 in this embodiment is typically discarded.

Another portion of the crude epoxidation product stream 172 is forwarded to a blending operation 190 as stream 174 to be blended with a curing agent stream 191 to form a curable composition of the present invention, shown as stream 192, which can subsequently be cured to form a thermoset. Optionally, any other additive stream 193 (shown as a dotted line), for example an epoxy resin other than the crude epoxidation stream 174, may be blended with the epoxidation product stream 174 and curing agent stream 191 in the blending operation 190 to form the curable composition stream 192.

Figure 2:
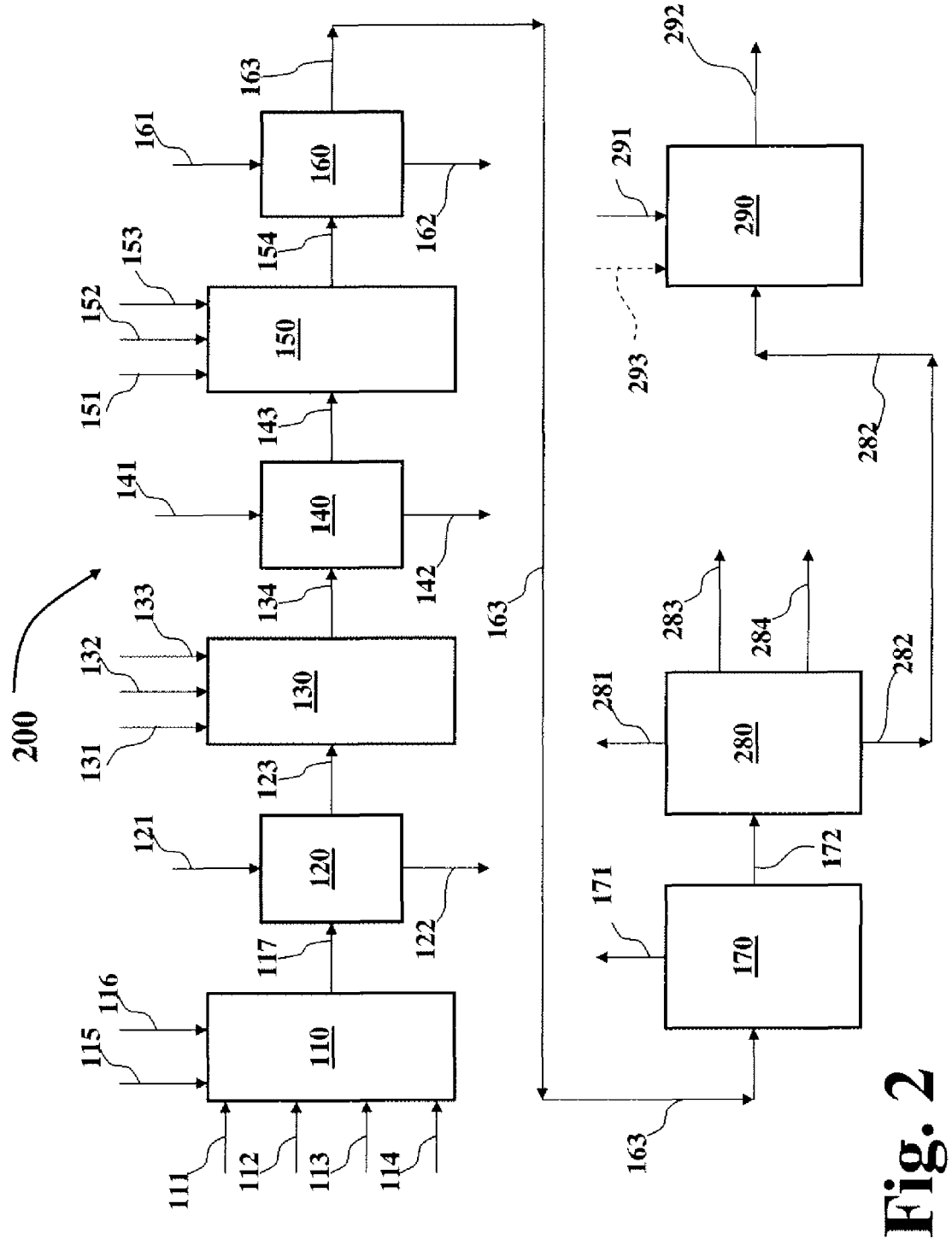
FIG. 2 is a schematic flow diagram showing a process for forming an epoxy resin product useful in the present invention.

With reference to FIG. 2 there is shown a general process, generally indicated by reference numeral 200, for manufacturing a PACE resin composition useful in the present invention. In this embodiment, the process is similar to the process shown in FIG. 1 and like reference numerals are used in FIG. 2 as the reference numerals in FIG. 1 to show the same stages, steps or operations.

One different embodiment between the process shown in FIG. 1 and the process shown in FIG. 2 includes forwarding the washed epoxidation product stream 163 of FIG. 2 from the third washing stage 160 to a devolatilization operation 170 to remove any lights 171 from the washed epoxidation product 163 to form a crude epoxidation product stream 172. In this embodiment, the crude epoxidation product stream 172 is forwarded to a fractionation operation 280 wherein a top lights stream 281, a bottoms stream 282, a partially or partially/fully epoxidized aliphatic or cycloaliphatic hydroxyl containing material stream 283, and a fully epoxidized aliphatic or cycloaliphatic hydroxyl containing material stream 284 are produced. In this embodiment, the bottoms stream 282 is the PACE resin composition useful in the present invention. The stream 282 is forwarded to a blending operation 290 to be blended with a curing agent stream 291 to form a curable composition of the present invention, shown as stream 292, which can subsequently be cured to form a thermoset. Optionally, any other additive stream 293 (shown as a dotted line), for example an epoxy resin other than the PACE stream 282, may be blended with the PACE stream 282 and curing agent stream 291 to form the curable composition stream 292.

It should be understood that any conventional equipment known to those skilled artisans can be used to carry out the manufacturing process of the present invention. For example, the equipment can include epoxidation reactor vessels; evaporation vessels such as rotary evaporators; and separation vessels such as distillation apparatus; which are known in the art. For example, generally, an evaporator is used for the devolatilization operation to strip a "lights" stream 171 from a product stream 172. The lights can comprise epihalohydrin, di(epoxypropyl)ether, minor amounts of unreacted aliphatic or cycloaliphatic hydroxyl containing material and other minor amounts of unknown "lights." The product stream 172 can comprise partially epoxidized aliphatic or cycloaliphatic hydroxyl containing material, fully epoxidized aliphatic or cycloaliphatic hydroxyl containing material, oligomers and minor unknown material. The stripped product effluent stream 172 from the devolatilization step 170 can then be fed into a separation vessel, such as a fractional vacuum distillation apparatus 280. In the distillation apparatus, several fractionation cuts are produced and may include additional "lights" stream 281, a stream of monoglycidyl ether and/or monoglycidyl and diglycidyl ether mixtures 283, and a high purity diglycidyl ether product stream 284. Also produced in the distillation apparatus can be a "bottoms" stream 282 comprising unrecovered fully epoxidized aliphatic or cycloaliphatic hydroxyl containing material and oligomers. The bottoms stream 282 is separated and isolated from the other streams leaving the distillation apparatus. Prior to the present invention, the pure product stream shown in FIG. 1 as stream 184 was forwarded to a subsequent process to form curable compositions and thermosets therefrom while the bottoms stream 182 was forwarded to a waste stream for discard. In the present invention, stream 282 is an example of a polyfunctional aliphatic or cycloaliphatic epoxy (PACE) resin useful in the present invention. The PACE resin can be mixed with a curing agent and/or a curing catalyst for making a thermosettable resin; and the thermosettable resin can be partially cured to form a B-stage material or completely cured to form a thermoset article.

There are several classes of hydroxyl-containing reactants that may be employed in the epoxidation process for the preparation of the thermosettable or thermoset PACE resin and curing agent and/or curing catalyst composition of the present invention, including for example the following classes:

(a) Cyclohexanedialkanols and Cyclohexenedialkanols

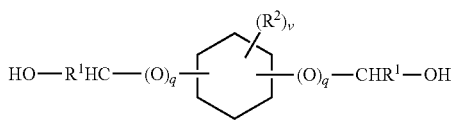

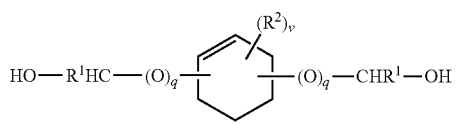

where each R¹ is independently —H or a $C_1$ to $C_6$ alkylene radical (saturated divalent aliphatic hydrocarbon radical), each R² is independently a $C_1$ to $C_{12}$ alkyl or alkoxy radical, a cycloalkyl or cycloalkoxy radical, or an aromatic ring or inertly substituted aromatic ring;

each q independently has a value of 0 or 1; and v has a value of 0 to 2.

Representative examples of the cyclohexanedialkanols and cyclohexenedialkanols include UNOXOL™ Diol (cis-, trans-1,3- and 1,4-cyclohexanedimethanol); cis-, trans-1,2-cyclohexanedimethanol; cis-, trans-1,3-cyclohexanedimethanol; cis-, trans-1,4-cyclohexanedimethanol; a methyl substituted cyclohexanedimethanol such as for example, a 4-methyl-1,2-cyclohexane-dimethanol or 4-methyl-1,1-cyclohexanedimethanol; 1,1-cyclohexanedimethanol; a cyclohexenedimethanol such as for example, 3-cyclohexene-1,1-dimethanol; 3-cyclohexene-1,1-dimethanol, 6-methyl-, 4,6-dimethyl-3-cyclohexene-1,1-dimethanol; cyclohex-2-ene-1,1-dimethanol; 1,1-cyclohexanediethanol; 1,4-bis(2-hydroxyethoxy)cyclohexane; 1,4-cyclohexanediethanol; mixtures thereof and the like. Included within this class of epoxy resins are the cyclohexanedioxyalkanols and cyclohexenedioxyalkanols, where at least one q has a value of 1. Specific examples include 1,4-(2-hydroxyethyloxy)cyclohexane and 1,4-(2-hydroxyethyloxy)cyclohex-2-ene. All possible geometric isomers are intended by the formulas and in the aforementioned list, even if the isomers are not explicitly shown or given.

A representative synthesis of 1,1-cyclohexanedimethanol is given by Manea, et al., Paint and Coatings Industry. Aug. 1, 2006, incorporated herein by reference in its entirety. A representative synthesis of 3-cyclohexene-1,1-dimethanol is described in U.S. Pat. No. 6,410,807, incorporated herein by reference.

UNOXOL™ Diol (cis-, trans-1,3- and 1,4-cyclohexanedimethanol) is a preferred cyclohexanedialkanol. As used herein, the term "cis-, trans-1,3- and -1,4-cyclohexanedimethylether moiety" means a structure or a blend of chemical structures comprising four geometric isomers, a cis-1,3-cyclohexanedimethylether; a trans-1,3-cyclohexanedimethylether structure; a cis-1,4-cyclohexanedimethylether; and a trans-1,4-cyclohexanedimethylether, within an epoxy resin. The four geometric isomers are shown in the following structures:

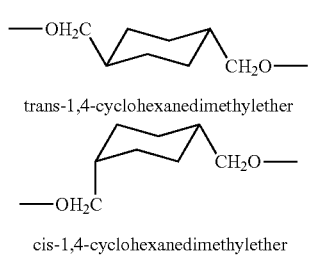

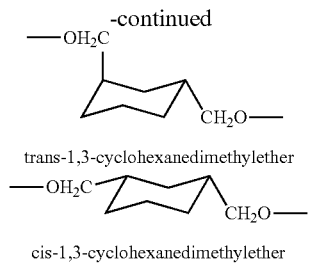

A detailed description of the epoxy resins comprising the cis-, trans-1,3- and 1,4-cyclohexanedimethylether moiety and the processes for preparing the same is provided in the aforementioned WO/2009/142901. Phase transfer catalyzed epoxidation of aliphatic diols using quaternary ammonium halide catalysts with epichlorohydrin to produce aliphatic epoxy resins with properties that are superior to the corresponding aliphatic epoxy resins produced via Lewis acid catalyzed coupling with epichlorohydrin is described in aforementioned EP 0 121 260. Included are epoxy resins prepared from cyclohexanedimethanol and dicyclopentadienedimethanol (isomers unspecified).

(b) Cyclohexanolmonoalkanols and Cyclohexenolmonoalkanols

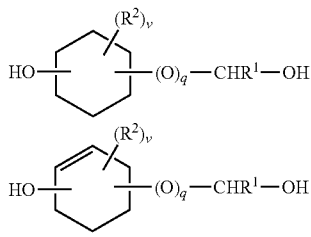

where each R¹, R², q and v are as hereinbefore defined.

Representative examples of the cyclohexanolmonoalkanols and cyclohexenolmonoalkanols which are aliphatic/cycloaliphatic hybrid diol structures containing one cyclohexanol or cyclohexenol moiety and one monoalkanol moiety, such as, for example, a monomethanol moiety, include, for example, 1-(hydroxymethyl)cyclohexanol, 1-(hydroxymethyl)cyclohex-3-enol, 3-hydroxymethylcyclohexanol, 4-hydroxymethylcyclohexanol, rac-1-isopropyl-4-methyl-2-cyclohexene-1alpha,2alpha-diol; 5beta-isopropyl-2-methyl-3-cyclohexene-1alpha,2alpha-diol; 2-hydroxymethyl-1,3,3-trimethyl-cyclohexanol; cyclohexanol, 1-(2-hydroxyethoxy); mixtures thereof and the like. All possible geometric isomers are intended by the formulas and in the aforementioned list, even if the isomers are not explicitly shown or given.

Another example of such compounds is trans-2-(hydroxymethyl)cyclohexanol prepared by Prins reaction on cyclohexane by Taira et al, Journal of the American Chemical Society, 106, 7831-7835 (1984), incorporated herein by reference. A second example is 1-phenyl-cis-2-hydroxymethyl-r-1-cyclohexanol disclosed in U.S. Pat. No. 4,125,558, incorporated herein by reference. A third example is trans-4-(hydroxymethyl)cyclohexanol reported by Kohei Tamao, et al, Organic Syntheses, Collective Volume 8, p. 315, Annual Volume 69, p. 96, incorporated herein by reference.

(c) Decahydronaphthalenedialkanols, Octahydronaphthalenedialkanols and 1,2,3,4-Tetrahydronaphthalenedialkanols

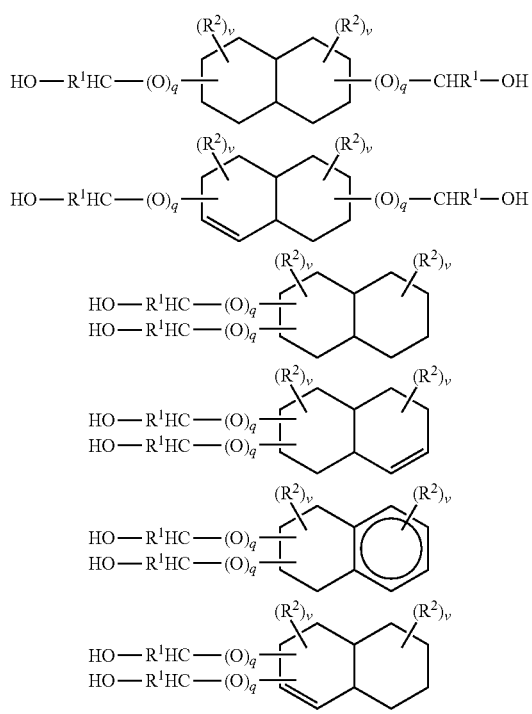

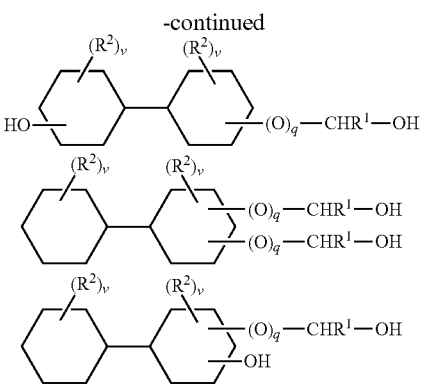

where each $R^1$, $R^2$, q and v are as hereinbefore defined.

Representative examples of the decahydronaphthalenedialkanols, octahydronaphthalenedialkanols and 1,2,3,4-tetrahydronaphthalenedialkanols containing one decahydronaphthalenedialkanol, octahydronaphthalenedialkanol or 1,2,3,4-tetrahydronaphthalenedialkanol moiety, include 1,2-decahydronaphthalenedimethanol; 1,3-decahydronaphthalenedimethanol; 1,4-decahydronaphthalenedimethanol; 1,5-decahydronaphthalenedimethanol; 1,6-decahydronaphthalenedimethanol; 2,7-decahydronaphthalenedimethanol; 1,2,3,4-tetrahydronaphthalenedimethanol (tetralin dimethanol); 1,2-octahydronaphthalenedimethanol; 2,7-octahydronaphthalenedimethanol; 4-methyl-1,2-decahydronaphthalenedimethanol; 4,5-dimethyl-2,7-decahydronaphthalenedimethanol; 1,2-decahydronaphthalenediethanol; 2,7-decahydronaphthalenediethanol; mixtures thereof and the like. All possible geometric isomers are intended by the formulas and in the aforementioned list, even if the isomers are not explicitly shown or given.

While not shown by the structures given above, it is intended that the hybrid diol structures also be included where one monoalkanol moiety is attached to a cycloaliphatic ring and one hydroxyl moiety is directly attached to a cycloaliphatic ring. One example of said hybrid structures would be 1-hydroxy-2-hydroxymethyldeca-hydronaphthalene.

(d) Bicyclohexanedialkanols or Bicyclohexanolmonoalkanols

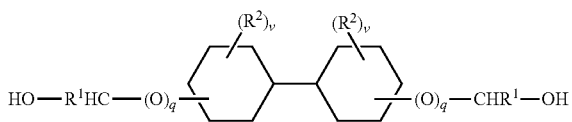

where each $R^1$, $R^2$, q and v are as hereinbefore defined.

Representative examples of the bicyclohexanedialkanols or bicyclohexanolmonoalkanols include bicyclohexane-4,4'-dimethanol; bicyclohexane-1,1'-dimethanol; bicyclohexane-1,2-dimethanol; bicyclohexane-4,4'-diethanol; bicyclohexane-1-hydroxy-1'-hydroxymethyl; bicyclohexane-4-hydroxy-4'-hydroxymethyl; mixtures thereof and the like. All possible geometric isomers are intended by the formulas and in the aforementioned list, even if the isomers are not explicitly shown or given.

While not shown by the structures given above, it is intended that epoxy resins of bicyclohexenedialkanols or bicyclohexenolmonoalkanols be included where either one or both rings may contain a single unsaturation. One example of said bicyclohexene structures would be the epoxy resin of bicyclohexene-1,1'-dimethanol.

(e) Bridged Cyclohexanols

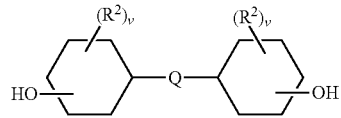

where each Q is a $C_1$ to $C_{12}$ alkylene radical (saturated divalent aliphatic hydrocarbon radical), O, S, O=S=O, S=O, C=O, $R^3$NC=O; $R^3$ is —H or a $C_1$ to $C_6$ alkyl radical (saturated monovalent aliphatic hydrocarbon radical); $R^2$ and v are as hereinbefore defined.

Representative examples of the bridged cyclohexanols include the following compounds where the aromatic rings have been hydrogenated to cyclohexane rings: bisphenol A (4,4'-isopropylidenediphenol); bisphenol F (4,4'-dihydroxydiphenylmethane); 4,4'-dihydroxydiphenylsulfone; 4,4'-dihydroxybenzanilide; 1,1'-bis(4-hydroxyphenyl)cyclohexane; 4,4'-dihydroxydiphenyl oxide; 4,4'-dihydroxybenzophenone; 1,1-bis(4-hydroxyphenyl)-1-phenylethane; 4,4'-bis(4(4-hydroxyphenoxy)-phenylsulfone)diphenyl ether; 2,2'-sulfonyldiphenol; 4,4'-thiodiphenol; dicyclopentadiene diphenol; and mixtures thereof.

(f) Other Cycloaliphatic and Polycycloaliphatic Diols, Monol Monoalkanols, or Dialkanols Most any cycloaliphatic or polycycloaliphatic diol, monol monoalkanol or dialkanol may be employed in the epoxidation process. Representative examples include the dicyclopentadienedimethanols; the norbornenedimethanols; the norbornanedimethanols; the cyclooctanedimethanols; the cyclooctenedimethanols; the cyclooctadienedimethanols; the pentacyclodecanedimethanols; the bicyclooctanedimethanols; the tricyclodecanedimethanols; the bicycloheptenedimethanols; the dicyclopentadienediols; the norbornenediols; the norbornanediols; the cyclooctanediols; the cyclooctenediols; the cyclooctadienediols; the cyclohexanediols; the cyclohexenediols; cyclopentane-1,3-diol; bicyclopentane-1,1'-diol; decahydronaphthalene-1,5-diol; trans, trans-2,6-dimethyl-2,6-octadiene-1,8-diol; 5-methylol-5-ethyl-2-(1,1-dimethyl-2-hydroxyethyl)-1,3-dioxane; 3,9-bis (1,1-dimethyl-2-hydroxyethyl)-2,4,8,10-tetra-oxaspiro[5.5] undecane; 3-methyl-2,2-norbornanedimethanol; 5-norbornene-2,3-dimethanol; norbornane-2,3-trans-dimethanol; perhydro-1,4:5,8-dimethanonaphthalene-2,3-trans-dimethanol; perhydro-1,4:5,8:9,10-trimethanoanthracene-2,3-trans-dimethanol; and 5-norbornene-2,3-dimethanol; norbornanolmonomethanols; and norbornenols; and mixtures thereof.

Preparation of norbornane-2,3-trans-dimethanol; perhydro-1,4:5,8-dimethanonaphthalene-2,3-trans-dimethanol; and perhydro-1,4:5,8:9,10-trimethanoanthracene-2,3-trans-dimethanol are reported by Wilson et al., Journal of Polymer Science: Polymer Chemistry Edition, volume 10, 3191-3204 (1972), incorporated herein by reference. Preparation of 5-norbornene-2,3-dimethanol is reported by Nakamura et al, Macromolecules, 23, 3032-3035 (1990), incorporated herein by reference.

(g) Aliphatic Hydroxyl-Containing Materials

Most any aliphatic hydroxyl-containing reactant may be employed in the epoxidation process. Representative of the aliphatic hydroxyl-containing reactants include alkoxylated phenolic reactants, such as, for example, ethoxylated catechol, ethoxylated resorcinol, ethoxylated hydroquinone, and ethoxylated bisphenol A; and mixtures thereof. Alkoxylation products of the hydrogenated aromatic phenolic reactants include ethoxylated hydrogenated bisphenol A. Other aliphatic hydroxyl-containing reactants include neopentyl glycol, trimethylol propane, ethylene glycol, propylene glycol, triethylene glycol, higher alkoxylated ethylene glycols, pentaerythritol, 1,4-butanediol; 1,6-hexanediol; and 1,12-dodecandiol; and mixtures thereof.

Epihalohydrins which may be employed in the epoxidation process include, for example, epichlorohydrin, epibromohydrin, epiiodohydrin, methylepichlorohydrin, methylepibromohydrin, methylepiiodohydrin, and any combination thereof. Epichlorohydrin is the preferred epihalohydrin.

The ratio of the epihalohydrin to the aliphatic or cycloaliphatic hydroxyl-containing material is generally from about 1:1 to about 25:1, preferably from about 1.8:1 to about 10:1, and more preferably from about 2:1 to about 5:1 equivalents of epihalohydrin per hydroxyl group in the aliphatic or cycloaliphatic hydroxyl containing material. The term "hydroxyl group" used herein refers to the hydroxyl groups derived from the aliphatic or cycloaliphatic hydroxyl containing material. Thus, the hydroxyl group differs from a secondary hydroxyl group formed during the process of the forming the halohydrin intermediate to the aliphatic or cycloaliphatic hydroxyl containing material.

Basic acting substances which may be employed in the epoxidation process include alkali metal hydroxides, alkaline earth metal hydroxides, carbonates, bicarbonates, and any mixture thereof, and the like. More specific examples of the basic acting substance include sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, magnesium bicarbonate, lithium bicarbonate, calcium bicarbonate, barium bicarbonate, manganese bicarbonate, and any combination thereof. Sodium hydroxide and/or potassium hydroxide are the preferred basic acting substance.

Non-Lewis acid catalysts which may be employed in the epoxidation process include, for example, ammonium, phosphonium, or sulfonium salts. More specific examples of the catalyst include salts of the following ammonium, phosphonium and sulfonium cations: benzyltributylammonium, benzyltriethylammonium, benzyltrimethylammonium, tetrabutylammonium, tetraoctylammonium, tetramethylammonium, tetrabutylphosphonium, ethyltriphenylphosphonium, triphenylsulfonium, 4-tert-butoxyphenyldiphenylsulfonium, bis(4-tert-butoxyphenyl)phenylsulfonium, tris(4-tert-butoxyphenyl)sulfonium, 3-tert-butoxyphenyldiphenylsulfonium, bis(3-tert-butoxyphenyl)phenylsulfonium, tris(3-tert-butoxyphenyl)sulfonium, 3,4-di-tert-butoxyphenyldiphenylsulfonium, bis(3,4-di-tert-butoxyphenyl)phenylsulfonium, tris(3,4-di-tert-butoxyphenyl)sulfonium, diphenyl(4-thiophenoxyphenyl) sulfonium, 4-tert-butoxycarbonylmethyloxyphenyl-diphenylsulfonium, tris(4-tert-butoxycarbonylmethyloxyphenyl)sulfonium, (4-tert-butoxyphenyl)bis(4-dimethylaminophenyl)sulfonium, tris (4-dimethyl-aminophenyl)sulfonium, 2-naphthyldiphenylsulfonium, (4-n-hexyloxy-3,5-dimethyl-phenyl)diphenylsulfonium, dimethyl(2-naphthyl)sulfonium, 4-methoxyphenyldimethyl-sulfonium, trimethylsulfonium, 2-oxocyclohexylcyclohexylmethylsulfonium, trinaphthyl-sulfonium, tribenzylsulfonium, diphenylmethylsulfonium, dimethylphenylsulfonium, 2-oxo-2-phenylethylthiacyclopentanium, diphenyl-2-thienylsulfonium, 4-n-butoxynaphthyl-1-thiacyclopentanium, 2-n-butoxynaphthyl-1-thiacyclopentanium, 4-methoxynaphthyl-1-thiacyclopentanium, and 2-methoxynaphthyl-1-thiacyclopentanium. Preferred cations are triphenylsulfonium, 4-tert-butylphenyldiphenylsulfonium, 4-tert-butoxyphenyldiphenylsulfonium, tris(4-tert-butylphenyl)sulfonium, tris(4-tert-butoxyphenyl)sulfonium, dimethylphenylsulfonium, and any combination thereof. Suitable quaternary phosphonium catalysts also include, for example, those quaternary phosphonium compounds disclosed in U.S. Pat. Nos. 3,948,855; 3,477,990 and 3,341,580 and Canadian Patent No. 858,648 all of which are incorporated herein by reference. Benzyltriethylammonium halides are the preferred catalyst, with benzyltriethylammonium chloride being most preferred.

While the amount of catalyst may vary due to factors such as reaction time and reaction temperature, the lowest amount of catalyst required to produce the desired effect is preferred. In general, the catalyst may be used in an amount of from about 0.5 wt % to about 25 wt %, preferably, from about 1 wt % to about 18 wt %, and more preferably, from about 2 wt % to about 12 wt %, based on the total weight of the aliphatic or cycloaliphatic hydroxyl-containing material.

The epihalohydrin may function as both a solvent and a reactant in the epoxidation. Alternatively, a solvent other than the epihalohydrin may also be used in the process for preparing the PACE resin. The solvent other than the epihalohydrin should be inert to any materials used in the process of preparing the PACE resin, including for example, reactants, catalysts, intermediate products formed during the process, and final products. Solvents which may optionally be employed in the epoxidation process include, for example, aliphatic and aromatic hydrocarbons, halogenated aliphatic hydrocarbons, aliphatic ethers, aliphatic nitriles, cyclic ethers, ketones, amides, sulfoxides, tertiary aliphatic alcohols, and any combination thereof.

Particularly preferred solvents include pentane, hexane, octane, toluene, xylene, methylethylketone, methylisobutylketone, dimethylsulfoxide, diethyl ether, tetrahydrofuran, 1,4-dioxane, dichloromethane, chloroform, ethylene dichloride, methyl chloroform, ethylene glycol dimethyl ether, acetonitrile, tertiary-butanol, N,N-dimethylformamide; N,N-dimethylacetamide; and any combination thereof.

If the solvent other than the epihalohydrin is employed in the epoxidation process, the minimum amount of solvent needed to achieve the desired result is preferred. In general, the solvent may be present in the process from about 5 wt % to about 250 wt %, preferably, about 20 wt % to about 180 wt %, and more preferably, about 40 wt % to about 120 wt %, based on the total weight of the aliphatic or cycloaliphatic hydroxyl-containing material. The solvent may be removed from the final product at the completion of the reaction of forming the epoxy resin using conventional methods, such as vacuum distillation.

A specific example of the PACE resin is the polyfunctional aliphatic/cycloaliphatic epoxy resin isolated from the epoxy resin of cis-, trans-1,3- and 1,4-cyclohexanedimethanol. It is to be understood that the PACE resin comprises multiple components. For the PACE resin isolated from the epoxy resin of cis-, trans-1,3- and 1,4-cyclohexanedimethanol, the following components have been identified and may or may not be present in the individual products depending on the chemistry and processing employed to produce said epoxy resin (geometrical isomers and substitution are not shown in the chemical structures, the multiple geometrical isomers that are present are not given by the chemical names, other unidentified components may be present):

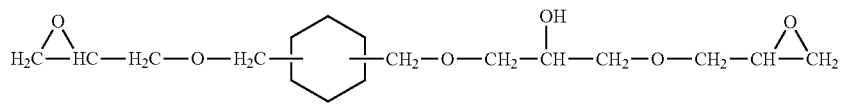

2-propanol, 1-(oxiranylmethoxy)-3-[[3(or 4)[(oxiranylmethoxy)methyl]cyclohexyl]methoxy]-

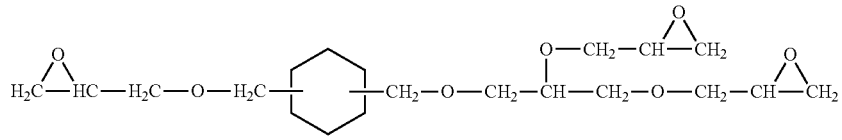

oxirane, 2-[[[3(or 4)-[[2,3-bis(oxiranylmethoxy)propoxy]methyl]cyclohexyl]methoxy]methyl]-

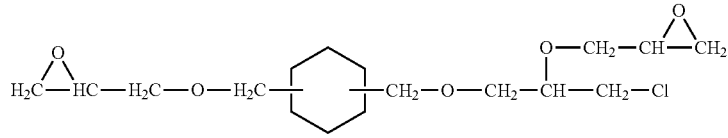

oxirane, 2-[[2-chlor-1-[[[3(or 4)-[(oxiranylmethoxy)methyl]cyclohexyl]methoxy]methyl]ethoxy]methyl]-

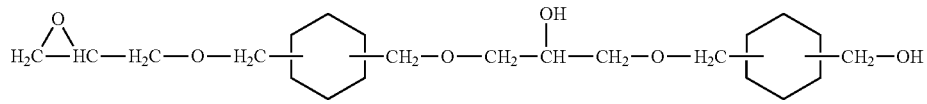

cyclohexanemethanol, 3(or 4)-[[2-hydroxy-3-[[3(or 4)-[(oxiranylmethoxy)methyl]cyclohexyl]methoxy]propoxy]methyl]-

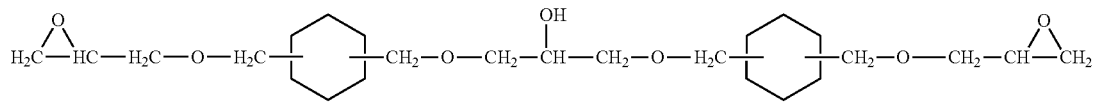

2-propanol, 1,3-bis[[3(or 4)-[(oxiranylmethoxy)methyl]cyclohexyl]methoxy]-

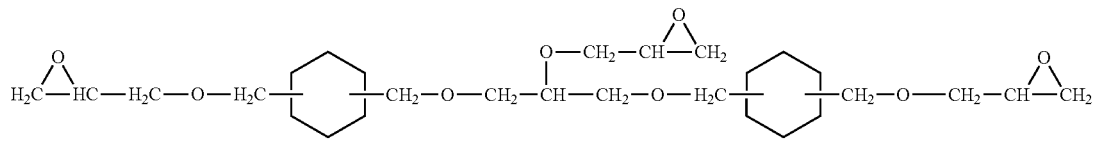

oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy]methyl]-

A minor amount of 3 isomeric monochloro compounds co-elute with this latter triglycidyl ether.

Component (B) of the present invention may include (i) an epoxy resin curing agent, (ii) an epoxy resin curing catalyst, or (iii) both component (i) and component (ii).

The epoxy resin curing agent and/or curing catalyst used in the present invention to form the thermosettable mixture with the PACE resin comprises at least one material having two or more reactive hydrogen atoms per molecule. The reactive hydrogen atoms are reactive with epoxide groups, such as those epoxide groups contained in the PACE resin.

Certain of the hydrogen atoms can be non-reactive with the epoxide groups in the initial process of forming the cured product but reactive in a later process of curing the epoxy resin, when there are other functional groups, which are much more reactive with the epoxide groups under reaction conditions used, present in the B-staging or thermosetting reaction of forming the thermoset product. For example, a reactive compound may have two different functional groups each bearing at least one reactive hydrogen atom, with one functional group being inherently more reactive with an epoxide group than the other under the reaction conditions used. These reaction conditions may include the use of a catalyst which favors a reaction of the reactive hydrogen atom(s) of one functional group with an epoxide group over a reaction of the reactive hydrogen atom(s) of the other functional group with an epoxide group. The catalyst may also be latent, for example under conditions of mixing the thermosettable mixture, then activated at a later time, for example by heating of the latently catalyzed thermosettable mixture.

Other non-reactive hydrogen atoms may also include hydrogen atoms in the secondary hydroxyl groups which form during an epoxide ring opening reaction in the process of producing the partially cured or fully cured product.

The curing agent may further comprise aliphatic, cycloaliphatic and/or aromatic groups within the curing agent structure. The aliphatic groups may be branched or unbranched. The aliphatic or cycloaliphatic groups may also be saturated or unsaturated and may comprise one or more substituents which are inert (not reactive) to the process of preparing the thermosettable compositions and thermosets of the present invention. The substituents may be attached to a terminal carbon atom or may be between two carbon atoms, depending on the chemical structures of the substituents. Examples of such inert substituents include halogen atoms, preferably chlorine or bromine, nitrile, nitro, alkyloxy, keto, ether (—O—), thioether (—S—), or tertiary amine. The aromatic ring, if present within the curing agent structure, may comprise one or more heteroatoms such as N, O, S and the like.

Examples of the curing agent may include compounds such as (i) di- and polyphenols, (ii) di- and polycarboxylic acids, (iii) di- and polymercaptans, (iv) di- and polyamines, (v) primary monoamines, (vi) sulfonamides, (vii) aminophenols, (viii) aminocarboxylic acids, (ix) phenolic hydroxyl containing carboxylic acids, (x) sulfanilamides, and (xi) any combination of any two or more of such compounds or the like.

Examples of the di- and polyphenols (i) include 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1'-bis(4-hydroxyphenyl)-1-phenylethane; 3,3',5,5'-tetrachlorobisphenol A; 3,3'-dimethoxybisphenol A; 3,3',5,5'-tetramethyl-4,4'-dihydroxydiphenyl; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; 1,1-bis(4-hydroxyphenyl)cyclohexane; 1,4-dihydroxy-3,6-dimethylbenzene; 1,4-dihydroxy-3,6-dimethoxybenzene; 1,4-dihydroxy-2-tert-butylbenzene; 1,4-dihydroxy-2-bromo-5-methylbenzene; 1,3-dihydroxy-4-nitrophenol; 1,3-dihydroxy-4-cyanophenol; tris(hydroxyphenyl)methane; dicyclopentadiene or an oligomer thereof and phenol or substituted phenol condensation products; and any mixture thereof.

Examples of the di- and polycarboxylic acids (ii) include 4,4'-dicarboxydiphenylmethane; terephthalic acid; isophthalic acid; 1,4-cyclohexanedicarboxylic acid; 1,6-hexanedicarboxylic acid; 1,4-butanedicarboxylic acid; dicyclopentadienedicarboxylic acid; tris(carboxyphenyl)methane; 1,1-bis(4-carboxyphenyl)cyclohexane; 3,3',5,5'-tetramethyl-4,4'-dicarboxydiphenyl; 4,4'-dicarboxy-alpha-methylstilbene; 1,4-bis(4-carboxyphenyl)-trans-cyclohexane; 1,1'-bis(4-carboxyphenyl)cyclohexane; 1,3-dicarboxy-4-methylbenzene; 1,3-dicarboxy-4-methoxybenzene; 1,3-dicarboxy-4-bromobenzene; and any combination thereof.

Examples of the di- and polymercaptans (iii) include 1,3-benzenedithiol; 1,4-benzenedithiol; 4,4'-dimercaptodiphenylmethane; 4,4'-dimercaptodiphenyl oxide; 4,4'-dimercapto-alpha-methylstilbene; 3,3',5,5'-tetramethyl-4,4'-dimercaptodiphenyl; 1,4-cyclohexanedithiol; 1,6-hexanedithiol; 2,2'-dimercaptodiethylether; 1,2-dimercaptopropane; bis(2-mercaptoethyl)sulfide; tris(mercaptophenyl)methane; 1,1-bis(4-mercaptophenyl)cyclohexane; and any combination thereof.

Examples of the di- and polyamines (iv) include 1,2-diaminobenzene; 1,3-diaminobenzene; 1,4-diaminobenzene; 4,4'-diaminodiphenylmethane; 4,4'-diaminodiphenylsulfone; 2,2'-diaminodiphenylsulfone; 4,4'-diaminodiphenyl oxide; 3,3',5,5'-tetramethyl-4,4'-diaminodiphenyl; 3,3'-dimethyl-4,4'-diaminodiphenyl; 4,4'-diamino-alpha-methylstilbene; 4,4'-diaminobenzanilide; 4,4'-diaminostilbene; 1,4-bis(4-aminophenyl)-trans-cyclohexane; 1,1-bis(4-aminophenyl)cyclohexane; tris(aminophenyl)methane; 1,4-cyclohexanediamine; 1,2-cyclohexanediamine; 1,6-hexanediamine; piperazine; ethylenediamine; diethyletriamine; triethylenetetramine; tetraethylenepentamine; 1-(2-aminoethyl)piperazine; bis(aminopropyl)ether; bis(aminopropyl)sulfide; bis(aminomethyl)norbornane; isophorone diamine; 1,3-xylenediamine; 2,2'-bis(4-aminocyclohexyl)propane; 4-(2-aminopropan-2-yl)-1-methylcyclohexan-1-amine (menthane diamine); 1,4-bis(aminocyclohexyl)methane; 1,3-bis(aminomethyl)cyclohexane; 1,4-bis(aminomethyl)cyclohexane; and any combination thereof.

Examples of the primary monoamines (v) include ammonia; aniline; 4-chloroaniline; 4-methylaniline; 4-methoxyaniline; 4-cyanoaniline; 2,6-dimethylaniline; 4-aminodiphenyl oxide; 4-aminodiphenylmethane; 4-aminodiphenylsulfide; 4-aminobenzophenone; 4-aminodiphenyl; 4-aminostilbene; 4-amino-alpha-methylstilbene; methylamine; 4-amino-4'-nitrostilbene; n-hexylamine; cyclohexylamine; aminonorbornane; N,N-diethyltrimethylenediamine; and any combination thereof.

Examples of the sulfonamides (vi) include phenylsulfonamide; 4-methoxyphenylsulfonamide; 4-chlorophenylsulfonamide; 4-bromophenylsulfonamide; 4-methylsulfonamide; 4-cyanosulfonamide; 2,6-dimethyphenylsulfonamide; 4-sulfonamidodiphenyl oxide; 4-sulfonamidodiphenylmethane; 4-sulfonamidobenzophenone; 4-sulfonylamidodiphenyl; 4-sulfonamidostilbene; 4-sulfonamido-alpha-methylstilbene; and any combination thereof.

Examples of the aminophenols (vii) include o-aminophenol; m-aminophenol; p-aminophenol; 2-methoxy-4-hydroxyaniline; 3,5-dimethyl-4-hydroxyaniline; 3-cyclohexyl-4-hydroxyaniline; 2,6-dibromo-4-hydroxyaniline; 5-butyl-4-hydroxyaniline; 3-phenyl-4-hydroxyaniline; 4-(1-(3-aminophenyl)-1-methylethyl)phenol; 4-(1-(4-aminophenyl)ethyl)phenol; 4-(4-aminophenoxy)phenol; 4-((4-aminophenyl)thio)phenol; (4-aminophenyl)(4-hydroxyphenyl)methanone; 4-((4-aminophenyl)sulfonyl)phenol; 4-(1-(4-amino-3,5-dibromophenyl)-1-methylethyl)-2,6-dibromophenol; N-methyl-p-aminophenol; 4-amino-4'-hydroxy-alpha-methylstilbene; 4-hydroxy-4'-amino-alpha-methylstilbene; and any combination thereof.

Examples of the aminocarboxylic acids (viii) include 2-aminobenzoic acid; 3-aminobenzoic acid; 4-aminobenzoic acid; 2-methoxy-4-aminobenzoic acid; 3,5-dimethyl-4-aminobenzoic acid; 3-cyclohexyl-4-aminobenzoic acid; 2,6-dibromo-4-aminobenzoic acid; 5-butyl-4-aminobenzoic acid; 3-phenyl-4-aminobenzoic acid; 4-(1-(3-aminophenyl)-1-methylethyl)benzoic acid; 4-(1-(4-aminophenyl)ethyl)benzoic acid; 4-(4-aminophenoxy)benzoic acid; 4-((4-aminophenyl)thio)benzoic acid; (4-aminophenyl)(4-carboxyphenyl)methanone; 4-((4-aminophenyl)sulfonyl)benzoic acid; 4-(1-(4-amino-3,5-dibromophenyl)-1-methylethyl)-2,6-dibromobenzoic acid; N-methyl-4-aminobenzoic acid; 4-amino-4'-carboxy-alpha-methylstilbene; 4-carboxy-4'-amino-alpha-methylstilbene; glycine; N-methylglycine; 4-aminocyclohexanecarboxylic acid; 4-aminohexanoic acid; 4-piperidinecarboxylic acid; 5-aminophthalic acid; and any combination thereof.

Examples of the carboxylic acids (ix) include 2-hydroxybenzoic acid; 3-hydroxybenzoic acid; 4-hydroxybenzoic acid; 2-methoxy-4-hydroxybenzoic acid; 3,5-dimethyl-4-hydroxybenzoic acid; 3-cyclohexyl-4-hydroxybenzoic acid; 2,6-dibromo-4-hydroxybenzoic acid; 5-butyl-4-hydroxybenzoic acid; 3-phenyl-4-hydroxybenzoic acid; 4-(1-(3-hydroxyphenyl)-1-methylethyl)benzoic acid; 4-(1-(4-hydroxyphenyl)ethyl)benzoic acid; 4-(4-hydroxyphenoxy)benzoic acid; 4-((4-hydroxyphenyl)thio)benzoic acid; (4-hydroxyphenyl)(4-carboxyphenyl)methanone; 4-((4-hydroxyphenyl)sulfonyl)benzoic acid; 4-(1-(4-hydroxy-3,5-dibromophenyl)-1-methyl-ethyl)-2,6-dibromobenzoic acid; 4-hydroxy-4'-carboxy-alpha-methylstilbene; 4-carboxy-4'-hydroxy-alpha-methylstilbene; 2-hydroxyphenylacetic acid; 3-hydroxyphenylacetic acid; 4-hydroxyphenylacetic acid; 4-hydroxyphenyl-2-cyclohexane-carboxylic acid; 4-hydroxyphenoxy-2-propanoic acid; and any combination thereof.

Examples of the sulfanilamides (x) include o-sulfanilamide; m-sulfanilamide; p-sulfanilamide; 2-methoxy-4-aminobenzoic acid; 2,6-dimethyl-4-sulfonamido-1-aminobenzene; 3-methyl-4-sulfonamido-1-aminobenzene; 5-methyl-3-sulfonamido-1-aminobenzene; 3-phenyl-4-sulfonamido-1-aminobenzene; 4-(1-(3-sulfonamidophenyl)-1-methylethyl)aniline; 4-(1-(4-sulfonamido-phenyl)ethyl)aniline; 4-(4-sulfonamidophenoxy)aniline; 4-((4-sulfonamido-phenyl)thio)aniline; (4-sulfonamidophenyl)(4-aminophenyl)methanone; 4-((4-sulfonamidophenyl)sulfonyl)aniline; 4-(1-(4-sulfonamido-3,5-dibromophenyl)-1-methylethyl)-2,6-dibromoaniline; 4-sulfonamido-1-N-methylaminobenzene; 4-amino-4'-sulfonamido-alpha-methylstilbene; 4-sulfonamido-4'-amino-alpha-methylstilbene; and any combination thereof.

Particularly preferred examples of the curing catalyst include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, metallic acylates such as stannous octoate or zinc octoate, and any combination thereof.

The curing catalyst may be employed in an amount which will effectively thermoset the curable epoxy resin composition or assist in the thermosetting of the thermosettable epoxy resin composition. The amount of the curing catalyst will also depend upon the particular PACE resin, the curing agent, if any, and epoxy resin other than the PACE resin, if any, employed in the thermosettable epoxy resin composition.

Generally, the curing catalyst may be used in an amount of from about 0.001 wt % to about 2 wt % of the total thermosettable epoxy resin composition. In addition, one or more of the curing catalysts may be employed to accelerate or otherwise modify the curing process of the curable epoxy resin composition.

Another embodiment of the present invention is directed to a thermosettable (curable) epoxy resin composition comprising components (A) and (B) described above; and (C) optionally, an epoxy resin compound other than the PACE resin component (A).

The epoxy resin which can be used as the epoxy resin, component (C), other than the PACE resin, component (A), may be any epoxide-containing compound which has an average of more than one epoxide group per molecule. The epoxide group can be attached to any oxygen, sulfur or nitrogen atom or the single bonded oxygen atom attached to the carbon atom of a —CO—O— group. The oxygen, sulfur, nitrogen atom, or the carbon atom of the —CO—O— group may be attached to an aliphatic, cycloaliphatic, polycycloaliphatic or aromatic hydrocarbon group. The aliphatic, cycloaliphatic, polycycloaliphatic or aromatic hydrocarbon group can be substituted with any inert substituents including, but not limited to, halogen atoms, preferably fluorine, bromine or chlorine; nitro groups; or the groups can be attached to the terminal carbon atoms of a compound containing an average of more than one —(O—CHR$^a$—CHR$^a$)$_t$— group, wherein each R$^a$ is independently a hydrogen atom or an alkyl or haloalkyl group containing from one to two carbon atoms, with the proviso that only one R$^a$ group can be a haloalkyl group, and t has a value from one to about 100, preferably from one to about 20, more preferably from one to about 10, and most preferably from one to about 5.

More specific examples of the epoxy resin which can be used as the epoxy resin (C) include diglycidyl ethers of 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1'-bis(4-hydroxyphenyl)-1-phenylethane; 3,3'-5,5'-tetrachlorobisphenol A; 3,3'-dimethoxybisphenol A; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; N,N'-bis(4-hydroxyphenyl)terephthalamide; 4,4'-dihydroxyazobenzene; 4,4'-dihydroxy-2,2'-dimethylazoxybenzene; 4,4'-dihydroxydiphenylacetylene; 4,4'-dihydroxychalcone; 4-hydroxyphenyl-4-hydroxybenzoate; dipropylene glycol; poly(propylene glycol); thiodiglycol; the triglycidyl ether of tris(hydroxyphenyl)methane; the polyglycidyl ethers of a phenol or alkyl or halogen substituted phenol-aldehyde acid catalyzed condensation product (novolac resins); the tetraglycidyl amines of 4,4'-diaminodiphenylmethane; 4,4'-diaminostilbene; N,N'-dimethyl-4,4'-diaminostilbene; 4,4'-diaminobenzanilide; 4,4'-diaminobiphenyl; the polyglycidyl ether of the condensation product of a dicyclopentadiene or an oligomer thereof and a phenol or alkyl or halogen substituted phenol; and any combination thereof.

The epoxy resin which can be used as the epoxy resin (C) may also include an advanced epoxy resin product. The advanced epoxy resin may be a product of an advancement reaction of (a) an epoxy resin with (b) an aromatic di- and polyhydroxyl, or carboxylic acid containing compound.

The epoxy resin used in the advancement reaction may include any one or more of the aforementioned general epoxy resins suitable for the epoxy resin comprising the di- or polyglycidyl ethers.

Examples of the aromatic di- and polyhydroxyl or carboxylic acid containing compound used in preparing the advancement epoxy resin may include hydroquinone; resorcinol; catechol; 2,4-dimethylresorcinol; 4-chlororesorcinol; tetramethylhydroquinone; bisphenol A; 4,4'-dihydroxydiphenylmethane; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1-bis(4-hydroxyphenyl)-1-phenylethane; 4,4'-bis(4(4-hydroxyphenoxy)-phenyl-sulfone) diphenyl ether; 4,4'-dihydroxydiphenyl disulfide; 3,3',3,5'-tetrachloro-4,4'-isopropylidenediphenol; 3,3',3,5'-tetrabromo-4,4'-isopropylidenediphenol; 3,3'-dimethoxy-4, 4'-isopropylidenediphenol; 4,4'-dihydroxybiphenyl; 4,4'-dihydroxy-alpha-methylstilbene; 4,4'-dihydroxybenzanilide; bis(4-hydroxyphenyl)terephthalate; N,N'-bis(4-hydroxyphenyl)terephthalamide; bis(4'-hydroxybiphenyl)terephthalate; 4,4'-dihydroxyphenylbenzoate; bis (4'-hydroxyphenyl)-1,4-benzenediimine; 1,1'-bis(4-hydroxyphenyl)cyclohexane; phloroglucinol; pyrogallol; 2,2',5,5'-tetrahydroxy-diphenylsulfone; tris(hydroxyphenyl)methane; dicyclopentadiene diphenol; tricyclopentadienediphenol; terephthalic acid; isophthalic acid; 4,4'-benzanilidedicarboxylic acid; 4,4'-phenylbenzoatedicarboxylic acid; 4,4'-stilbenedicarboxylic acid; adipic acid; and any combination thereof.

Preparation of the aforementioned advanced epoxy resin products can be performed using known methods, for example, an advancement reaction of an epoxy resin with one or more suitable compounds having an average of more than one reactive hydrogen atom per molecule, wherein the reactive hydrogen atom is reactive with an epoxide group in the epoxy resin.

The ratio of the compound having an average of more than one reactive hydrogen atom per molecule to the epoxy resin is generally from about 0.01:1 to about 0.95:1, preferably from about 0.05:1 to about 0.8:1, and more preferably from about 0.10:1 to about 0.5:1 equivalents of the reactive hydrogen atom per equivalent of the epoxide group in the epoxy resin.

In addition to the aforementioned dihydroxyaromatic and dicarboxylic acid compounds, examples of the compound having an average of more than one reactive hydrogen atom per molecule may also include dithiol, disulfonamide or compounds containing one primary amine or amide group, two secondary amine groups, one secondary amine group and one phenolic hydroxy group, one secondary amine group and one carboxylic acid group, or one phenolic hydroxy group and one carboxylic acid group, and any combination thereof.

The advancement reaction may be conducted in the presence or absence of a solvent with the application of heat and mixing. The advancement reaction may be conducted at atmospheric, superatmospheric or subatmospheric pressures and at temperatures of from about 20° C. to about 260° C., preferably, from about 80° C. to about 240° C., and more preferably from about 100° C. to about 200° C.

The time required to complete the advancement reaction depends upon factors such as the temperature employed, the chemical structure of the compound having more than one reactive hydrogen atom per molecule employed, and the chemical structure of the epoxy resin employed. Higher temperature may require shorter reaction time whereas lower temperature requires a longer period of reaction time.

In general, the time for completion of the advancement reaction may range from about 5 minutes to about 24 hours, preferably from about 30 minutes to about 8 hours, and more preferably from about 30 minutes to about 4 hours.

A catalyst may also be added in the advancement reaction. Examples of the catalyst may include phosphines, quaternary ammonium compounds, phosphonium compounds and tertiary amines. The catalyst may be employed in quantities of from about 0.01 wt % to about 3 wt %, preferably from about 0.03 wt % to about 1.5 wt %, and more preferably from about 0.05 wt % to about 1.5 wt % based upon the total weight of the epoxy resin.

Other details concerning an advancement reaction useful in preparing the advanced epoxy resin product (C) are provided in U.S. Pat. No. 5,736,620 and in *Handbook of Epoxy Resins* by Henry Lee and Kris Neville, both of which are incorporated herein by reference.

The term "curable" (also referred to as "thermosettable") means that the composition is capable of being subjected to conditions which will render the composition to a cured or thermoset state or condition. The term "cured" or "thermoset" is defined by L. R. Whittington in *Whittington's Dictionary of Plastics* (1968) on page 239 as follows: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The thermosettable epoxy resin composition of the present invention is prepared by mixing the PACE resin and, optionally, an epoxy resin other than the PACE resin, with the curing agent and/or catalyst in amounts which will effectively thermoset the curable epoxy resin composition, with the understanding that the amounts will depend upon the specific PACE resin, any optionally used epoxy resin, and the curing agent and/or catalyst employed.

Generally, the ratio of the curing agent (B) and the PACE resin (A) and epoxy resin other than the PACE resin (C), if used; is from about 0.60:1 to about 1.50:1, and preferably from about 0.95:1 to about 1.05:1 equivalents of reactive hydrogen atom present in the curing agent per equivalent of epoxide group in the epoxy resin(s) at the conditions employed for curing.

A preferred curable epoxy resin composition of the present invention comprises an aliphatic and/or cycloaliphatic curing agent and the PACE resin. The curable epoxy resin composition, when cured, provides a cured epoxy resin free of any aromatic group.

A more specific preferred curable epoxy resin composition of the present invention comprises an alkyleneamine (polyalkylenepolyamine) curing agent, such as, for example, ethylenediamine, diethylenetriamine or triethylenetetramine and the PACE resin. The curable epoxy resin composition, when cured, provides a cured epoxy resin free of any aromatic group.

Another preferred curable epoxy resin composition of the present invention comprises (1) aliphatic and/or cycloaliphatic curing agent, (2) the PACE resin and (3) an epoxy resin other than the PACE resin wherein the epoxy resin (3) comprises one or more of an aliphatic and/or cycloaliphatic epoxy resin(s). The curable epoxy resin composition, when cured, provides a cured epoxy resin free of any aromatic group.

A more specific preferred curable epoxy resin composition of the present invention comprises (1) an alkyleneamine (polyalkylenepolyamine) curing agent, (2) the PACE resin and (3) an epoxy resin other than the PACE resin wherein the epoxy resin (3) comprises one or more of an aliphatic and/or cycloaliphatic epoxy resin(s). The curable epoxy resin composition, when cured, provides a cured epoxy resin free of any aromatic group.

The thermosettable epoxy resin composition may also be blended with at least one additive including, for example, a cure accelerator, a solvent or diluent, a modifier such as a flow modifier and/or a thickener, a reinforcing agent, a filler, a pigment, a dye, a mold release agent, a wetting agent, a stabilizer, a fire retardant agent, a surfactant, or any combination thereof.

The additive may be blended with the PACE resin, the curing agent, if used, and the epoxy resin other than the PACE resin, if used, or with any combination thereof prior to use for the preparation of the thermosettable epoxy resin composition of the present invention.

These additives may be added in functionally equivalent amounts, for example, the pigment and/or dye may be added in quantities which will provide the composition with the desired color. In general, the amount of the additives may be from about zero wt % to about 20 wt %, preferably from about 0.5 wt % to about 5 wt %, and more preferably from about 0.5 wt % to about 3 wt % based upon the total weight of the thermosettable epoxy resin composition.

The cure accelerator which can be employed herein includes, for example, mono, di, tri and tetraphenols; chlorinated phenols; aliphatic or cycloaliphatic mono or dicarboxylic acids; aromatic carboxylic acids; hydroxybenzoic acids; halogenated salicylic acids; boric acid; aromatic sulfonic acids; imidazoles; tertiary amines; aminoalcohols; aminopyridines; aminophenols; mercaptophenols; and any mixture thereof.

Particularly suitable cure accelerators include 2,4-dimethylphenol; 2,6-dimethylphenol; 4-methylphenol; 4-tertiarybutylphenol; 2-chlorophenol; 4-chlorophenol; 2,4-dichlorophenol; 4-nitrophenol; 1,2-dihydroxybenzene; 1,3-dihydroxybenzene; 2,2'-dihydroxybiphenyl; 4,4'-isopropylidenediphenol; valeric acid; oxalic acid; benzoic acid; 2,4-dichlorobenzoic acid; 5-chlorosalicylic acid; salicylic acid; p-toluenesulfonic acid; benzenesulfonic acid; hydroxybenzoic acid; 4-ethyl-2-methylimidazole; 1-methylimidazole; triethylamine; tributylamine; N,N-diethylethanolamine; N,N-dimethylbenzylamine; 2,4,6-tris(dimethylamino)phenol; 4-dimethylaminopyridine; 4-aminophenol; 2-aminophenol; 4-mercaptophenol; and any combination thereof.

Examples of the solvent or diluent which can be employed herein include, for example, aliphatic and aromatic hydrocarbons, halogenated aliphatic hydrocarbons, aliphatic ethers, aliphatic nitriles, cyclic ethers, glycol ethers, esters, ketones, amides, sulfoxides, and any combination thereof.

Particularly suitable solvents include pentane; hexane; octane; toluene; xylene; methylethylketone; methylisobutylketone; dimethylsulfoxide; diethyl ether; tetrahydrofuran; dichloromethane; chloroform; ethylene dichloride; methyl chloroform; ethylene glycol dimethyl ether; diethylene glycol methyl ether; dipropylene glycol methyl ether; N-methylpyrrolidinone; acetonitrile; sulfolane; 1,4-dioxane; N,N-dimethylformamide; N,N-dimethylacetamide; and any combination thereof.

The modifier such as the thickener and the flow modifier may be employed in amounts of from zero wt % to about 10 wt %, preferably, from about 0.5 wt % to about 6 wt %, and more preferably from about 0.5 wt % to about 4 wt %, based upon the total weight of the thermosettable epoxy resin blend composition.

The reinforcing material which may be employed herein includes natural and synthetic fibers in the form of woven fabric, mat, monofilament, multifilament, unidirectional fiber, roving, random fiber or filament, inorganic filler or whisker, or hollow sphere. Other suitable reinforcing material includes glass, carbon, ceramics, nylon, rayon, cotton, aramid, graphite, polyalkylene terephthalates, polyethylene, polypropylene, polyesters, and any combination thereof.

The filler which may be employed herein includes, for example, inorganic oxide, ceramic microsphere, plastic microsphere, glass microsphere, inorganic whisker, calcium carbonate, and any combination thereof.

The filler may be employed in an amount of from about zero wt % to about 95 wt %, preferably from about 10 wt % to about 80 wt %, and more preferably from about 40 wt % to about 60 wt %, based upon the total weight of the thermosettable epoxy resin composition.

Another embodiment of the present invention comprises a partially cured (B-staged) product or totally cured (thermoset) product from the thermosettable epoxy resin composition described above.

The process of thermosetting the thermosettable epoxy resin composition of the present invention may be conducted at atmospheric (e.g. 760 mm Hg), superatmospheric or subatmospheric pressures and at a temperature from about 0° C. to about 300° C., preferably from about 25° C. to about 250° C., and more preferably from about 50° C. to about 200° C.

The time required to complete the curing may depend upon the temperature employed. Higher temperatures generally require a shorter period of time whereas lower temperatures generally require longer periods of time. In general, the required time for completion of the curing is from about 1 minute to about 48 hours, preferably from about 15 minutes to about 24 hours, and more preferably from about 30 minutes to about 12 hours.

It is also operable to partially thermoset the thermosettable epoxy resin composition of the present invention to form a B-stage product and subsequently cure the B-stage product completely at a later time.

Another embodiment of the present invention comprises an article prepared from the B-staged or totally cured (thermoset) product described above. The article may include, for example, coatings, especially protective coatings with excellent solvent resistant, moisture resistant, abrasion resistant, impact resistant, and weatherable (e.g., UV resistant, non-chalking) properties.

In addition to the coatings, the thermosettable and thermoset PACE resin compositions of the present invention may be beneficially employed in a wide variety of other end uses, such as for example, use as a reactive toughener for thermosets including epoxy resin based thermosets; can and coil coatings; maintenance coatings including coatings for stone, concrete and flooring; marine coatings including anti-fouling coatings; powder coatings including both decorative and functional types; automotive coatings; corrosion resistant coatings; electrical or structural laminates and composites; encapsulations; general castings; coatings for other plastics and metals; sealants; filament windings; moldings; polymer modified concrete; binders; adhesives including window glass adhesives; paints lacquers, and varnishes.

Articles which comprise a fully aliphatic/cycloaliphatic cured epoxy resin (with no aromatic rings) of the present invention are especially desirable for their outstanding balance of physical and mechanical properties.

EXAMPLES

The following examples further illustrate the present invention in detail but are not to be construed to limit the scope thereof.

The following standard abbreviations are used in the Examples, Reference Examples and Comparative Examples: "GC" stands for gas chromatography (chromatographic); MS stands for mass spectrometry (spectrometric); "DSC" stands for differential scanning calorimetry; Tg stands for glass transition temperature(s); "EEW" stands for epoxide equivalent weight; "AHEW" stands for amine hydrogen equivalent weight; "DI" stands for deionized; "meq" stands for milliequivalent(s); "eq" stands for equivalent(s); "wt" stands for weight(s); "min" stands for minute(s); "hr" stands for hour(s); "g" stands for gram(s); "mL" stands for milliliter(s); "L" stands for liter(s); "LPM" stands for liter(s) per minute; "μm" stands for micrometer(s); "mm" stands for millimeter(s); "m" stands for meter(s); "cp" stands for centipoise; "J" stands for joule(s); "EDA" stands for ethylenediamine; "DETA" stands for diethylenetriamine; and "TETA" stands for triethylenetetramine In the following Examples, Reference Examples, and Comparative Examples, standard analytical equipment and methods are used such as for example, the following:

Gas Chromatogphic Analysis: Area %

In the general method, a Hewlett Packard 5890 Series II Plus gas chromatograph was employed using a DB-1 capillary column (61.4 m by 0.25 mm with a 0.25 μm film thickness, Agilent). The column was maintained in the chromatograph oven at a 50° C. initial temperature. Both the injector inlet and flame ionization detector were maintained at 300° C. Helium carrier gas flow through the column was maintained at 1.1 mL per min. For the analyses of the epoxy resins during synthesis or from the rotary evaporation, an initial 50° C. oven temperature with heating at 12° C. per min to a final temperature of 300° C. revealed that essentially all light boiling components, including residual epichlorohydrin, cyclohexanedimethanols and monoglycidyl ethers of the cyclohexanedimethanols had been removed by the rotary evaporation. For the analyses of the PACE resins, an initial 250° C. oven temperature with heating at 13.3° C. per min to a final temperature of 300° C. was employed for complete elution of all oligomeric components within 50 min total time for the analysis. All GC analyses in area % are not a quantitative measure of any given component.

Samples for GC analysis were prepared by collection of a 0.5 mL aliquot of the slurry product from the epoxidation and addition to a vial containing 1 mL of acetonitrile. After shaking to mix, a portion of the slurry in acetonitrile was loaded into a 1 mL syringe (Norm-Ject, all polypropylene/polyethylene. Henke Sass Wolf GmBH) and passed through a syringe filter (Acrodisc CR 13 with 0.2 μm PTFE membrane, Pall Corporation, Gelman Laboratories) to remove any insoluble debris.

Internally Standardized Gas Chromatographic Analysis for Weight Percent Residual Diglycidyl Ethers of cis-, trans-1,3- and 1,4-Cyclohexanedimethanol in the Polyfunctional Cycloaliphatic Epoxy Resin A single point internal standard method was developed for GC analysis of residual diglycidyl ethers of cis-, trans-1,3- and 1,4-cyclohexanedimethanol remaining in the PACE resins. Cyclohexanone was selected as the internal standard since it had a retention time that was different from that of any other components observed in the analyses of the epoxidation products. For the analyses using an internal standard, an initial 50° C. oven temperature with heating at 12° C. per min to a final temperature of 300° C. was employed. For the standard of the diglycidyl ether of cis-, trans-1,3- and 1,4-cyclohexanedimethanol, a distillation cut was employed. This distillation cut contained 0.71 wt % monoglycidyl ethers and 99.29 wt % diglycidyl ethers. A 0.2500 g sample of the standard of the diglycidyl ethers plus 0.7500 g of acetonitrile plus 5 μL of cyclohexanone weighing 0.0047 g. were added to a glass vial. Three separate injections were made in the gas chromatograph and the resultant area counts were averaged for the cyclohexanone and for the diglycidyl ether. This data was used to calculate the internal response factor, as follows:

$$\text{Internal Response Factor} = \frac{(\text{area internal standard})(\text{amount diglycidyl ethers})}{(\text{amount internal standard})(\text{area diglycidyl ethers})}$$

An aliquot (approximately 0.2500 g) of the PACE resin, acetonitrile (approximately 0.7500 g) and cyclohexanone (5 μL, approximately 0.0047 g) were added to a glass vial and analyzed by GC. Using the data from the GC analysis plus the internal response factor, the following calculation was performed:

$$\text{Amount Diglycidyl Ethers} = \frac{(\text{amount internal standard})}{(\text{area internal standard})}(\text{area diglycidyl ethers})(\text{Internal Response Factor})$$

I.C.I. Cone and Plate Viscosity

Viscosity was determined on an I.C.I. Cone and Plate Viscometer Viscosity (model VR-4540) at 25° C. In the method, the viscometer equipped with a 0-40 poise spindle (model VR-4140) and equilibrated to 25° C. was calibrated to zero then the sample applied and held 2 min with viscosity then checked and the reading taken after 15 seconds. One or more duplicate viscosity tests were completed using a fresh aliquot of the particular product being tested. The individual measurements were averaged.

Percent Epoxide/Epoxide Equivalent Weight Analysis

A standard titration method was used to determine percent epoxide in the various epoxy resins [Jay, R. R., "Direct Titration of Epoxy Compounds and Aziridines", Analytical Chemistry, 36, 3, 667-668 (March, 1964).]. In the present adaptation of this method, the carefully weighed sample (sample weight ranges from 0.2-0.25 g) was dissolved in dichloromethane (15 mL) followed by the addition of tetraethylammonium bromide solution in acetic acid (15 mL). The resultant solution treated with 3 drops of crystal violet indicator (0.1% w/v in acetic acid) was titrated with 0.1N perchloric acid in acetic acid on a Metrohm 665 Dosimat titrator (Brinkmann). Titration of a blank consisting of dichloromethane (15 mL) and tetraethylammonium bromide solution in acetic acid (15 mL) provided correction for solvent background. Percent epoxide and EEW were calculated using the following equations:

$$\text{\% Epoxide} = \frac{[(\text{mL titrated sample}) - (\text{mL titrated blank})](0.4303)}{(\text{g sample titrated})}$$

$$EEW = \frac{4303}{\text{\% epoxide}}$$

Differential Scanning Calorimetry (DSC)

For analysis of (1) curing of the thermosettable blends of a PACE resin with a curing agent and of the (2) Tg of a cured sample a DSC 2910 Modulated DSC (TA Instruments) was employed. A heating rate of 7° C. per min from 0° C. to 250° C. was used under a stream of nitrogen flowing at 35 cubic centimeters per min. Each sample analyzed for curing was contained in an aluminum pan and loosely covered (not sealed) with an aluminum lid. Each cured sample for analysis of Tg was contained in an open aluminum pan. The respective sample weight tested is given with the results obtained.

Reference Example 1

Two Stage Synthesis of Epoxy Resin of cis-, trans-1,3- and 1,4-Cyclohexanedimethanol Epoxidation of cis-, trans-1,3- and 1,4-cyclohexanedimethanol (UNOXOL™ Diol) was performed using two stages of aqueous sodium hydroxide addition followed by fractional vacuum distillation to separate the constituents of the epoxy resin:

A. Epoxidation Reaction

A 5 L, 4 neck, glass, round bottom reactor was charged with UNOXOL™ Diol (432.63 g, 3.0 moles, 6.0 hydroxyl eq), epichlorohydrin (1110.24 g, 12.0 moles, 2:1 epichlorohydrin:UNOXOL™ Diol hydroxyl eq ratio), toluene (2.5 L), and benzyltriethylammonium chloride (43.62 g, 0.1915 mole) in the indicated order. [UNOXOL™ cyclic dialcohol is a registered trademark of Union Carbide Corporation.] The reactor was additionally equipped with a condenser (maintained at 0° C.), a thermometer, a Claisen adaptor, an overhead nitrogen inlet (1 LPM $N_2$ used), and a stirrer assembly (Teflon™ paddle, glass shaft, variable speed motor). [Teflon™ fluorocarbon resin is a trademark of E.I. duPont de Nemours.] A controller monitored the temperature registered on the thermometer in the reactor and provided heating via the heating mantle placed under the reactor as well as cooling delivered by a pair of fans positioned on the reactor exterior. Sodium hydroxide (360.0 g, 9.0 moles) dissolved in DI water (360 g) for the initial addition was added to a side arm vented addition funnel, sealed with a ground glass stopper, then attached to the reactor. Stirring commenced to give a 25° C. mixture followed by commencement of dropwise addition of the aqueous sodium hydroxide solution. The reaction mixture was allowed to self-heat to 40° C. during the aqueous sodium hydroxide addition time and then held at that temperature via cooling from the fans as needed. Thus, after 130 min, 42.3% of the aqueous sodium hydroxide was added causing the reaction temperature to first reach 39-40° C. and then remain at that temperature range for the remainder of the aqueous sodium hydroxide addition. Addition of the aqueous sodium hydroxide required a total of 248 minutes. After 16 hr of postreaction the temperature had declined to 26° C., stirring ceased, and the reactor contents allowed to settle. The organic layer was decanted from the reactor followed by addition of 1.5 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 4.51 area % light components, 2.32 area % unreacted cis-, trans-1,3- and 1,4-cyclohexanedimethanol; 43.14 area % monoglycidyl ethers, 0.14 area % of a pair of components associated with the diglycidyl ether peaks, 45.83 area % diglycidyl ethers, and 4.06 area % oligomers that were volatile under the conditions of the GC analysis.

The organic layer was reloaded into the reactor along with fresh benzyltriethylammonium chloride (21.81 g, 0.1915 mole). Sodium hydroxide (180 g, 4.5 moles) dissolved in DI water (180 g) was added to a side arm vented addition funnel, sealed with a ground glass stopper, then attached to the reactor. Stirring commenced to give a 24° C. mixture followed by commencement of dropwise addition of the aqueous sodium hydroxide solution. The reaction mixture was allowed to self-heat during the aqueous sodium hydroxide addition time. Thus, after 120 min 100% of the aqueous sodium hydroxide was added causing the reaction temperature to reach a maximum of 34.5° C. After 16.2 hr of postreaction the temperature had declined to 24° C., stirring ceased, and the reactor contents allowed to settle. The organic layer was decanted from the reactor followed by addition of 1.0 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 5.16 area % light components, 0.27 area % unreacted cis-, trans-1,3- and 1,4-cyclohexanedimethanol; 13.64 area % monoglycidyl ethers, 0.26 area % of a pair of components associated with the diglycidyl ether peaks, 73.68 area % diglycidyl ethers, and 6.99 area % oligomers that were volatile under the conditions of the GC analysis.

B. Epoxy Resin Product Isolation

After removal of the aqueous layer from the reaction with the second aqueous sodium hydroxide addition, the organic layer was equally split between the pair of separatory funnels and the contents of each respective separatory funnel then washed with DI water (400 mL) by vigorously shaking. The washed product was allowed to settle for 2 hr, then the aqueous layer was removed and discarded as waste. A second wash was completed using the aforementioned method, with settling overnight (20 hr) required to fully resolve the organic and aqueous layers. The combined, hazy organic solution was filtered through a bed of anhydrous, granular sodium sulfate in a 600 mL fritted glass funnel providing a transparent filtrate.

Rotary evaporation of the filtrate using a maximum oil bath temperature of 106° C. to a final vacuum of 2.4 mm of Hg removed the bulk of the volatiles. A total of 731.45 g of light yellow colored, transparent liquid was recovered after completion of the rotary evaporation. GC analysis after normalization to remove solvent (acetonitrile) revealed the presence of 14.37 area % monoglycidyl ethers, 0.20 area % of a pair of components associated with the diglycidyl ether peaks, 81.98 area % diglycidyl ethers, and 3.45 area % oligomers that were volatile under the conditions of the GC analysis. Thus, GC analysis revealed that essentially all light boiling components, including residual epichlorohydrin, had been removed.

C. Fractional Vacuum Distillation

A portion (730.72 g) of the product from the rotary evaporation was added to a 1 L, 3 neck, glass, round bottom reactor equipped with magnetic stiffing and a thermometer for monitoring the pot temperature. A one piece integral vacuum jacketed Vigreux distillation column and head was attached to the reactor. The distillation column nominally provided 9 to 18 theoretical plates depending on the mode of operation. The distillation head was equipped with an overhead thermometer, air cooled condenser, a receiver and a vacuum takeoff. A vacuum pump was employed along with a liquid nitrogen trap and an in-line digital thermal conductivity vacuum gauge. Stirring commenced followed by application of full vacuum then progressively increased heating using a thermostatically controlled heating mantle. A clean receiver was used to collect each respective distillation cut. During the distillation, the initial distillation cuts were taken to sequentially remove all components boiling below the cyclohexanedimethanols, all unreacted cyclohexanedimethanols, and the bulk of the monoglycidyl ethers. The final distillation cuts sought to selectively remove diglycidyl ether, leaving the oligomeric product (215.32 g) in the distillation pot. GC analysis using a cyclohexanone internal standard revealed that the oligomers contained residual 5.51 wt % diglycidyl ether with the balance as the oligomers. After normalization to remove the peaks associated with acetonitrile solvent and the diglycidyl ether, the GC analysis demonstrated the following oligomeric components containing multiple isomers:

4.52 area % 2-propanol, 1-(oxiranylmethoxy)-3-[[3(or 4)-[(oxiranylmethoxy)methyl]cyclohexyl]methoxy]- and oxirane, 2-[[2-chloro-1-[[[3(or 4)-[(oxiranylmethoxy)methyl]cyclohexyl]methoxy]methyl]ethoxy]methyl]-

20.39 area % oxirane, 2-[[[3(or 4)-[[2,3-bis(oxiranylmethoxy)propoxy]methyl]cyclohexyl]methoxy]methyl]-

1.44 area % cyclohexanemethanol, 3(or 4)-[[2-hydroxy-3-[[3(or 4)-[(oxiranylmethoxy)methyl]cyclohexyl]methoxy]propoxy]methyl]-

22.03 area % 2-propanol, 1,3-bis[[3(or 4)-[(oxiranylmethoxy)methyl]cyclohexyl]methoxy]-

51.62 area % oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy]methyl]-

Titration demonstrated an EEW of 197.1. I.C.I. cone and plate viscosity was 3472 cp.

Reference Example 2

Two Stage Synthesis of Epoxy Resin of cis-, trans-1,3- and 1,4-Cyclohexanedimethanol with Recycle of Monoglycidyl Ether and Diglycidyl Ether of cis-, trans-1,3- and 1,4-Cyclohexanedimethanol in Stage 1

Epoxidation of cis-, trans-1,3- and 1,4-cyclohexanedimethanol (UNOXOL™ Diol) was performed using two stages of aqueous sodium hydroxide addition with recycle of MGE and DGE of cis-, trans-1,3- and 1,4-cyclohexanedimethanol in the first stage followed by fractional vacuum distillation to separate the constituents of the epoxy resin:

A. Epoxidation Reaction

A 5 L, 4 neck, glass, round bottom reactor was charged with UNOXOL™ Diol (432.63 g, 3.0 moles, 6.0 hydroxyl eq), epichlorohydrin (1110.24 g, 12.0 moles, 2:1 epichlorohydrin:UNOXOL™ Diol hydroxyl eq ratio), toluene (2.5 L), benzyltriethylammonium chloride (43.62 g, 0.1915 mole), and a recycle stream consisting of monoglycidyl ether of cis-, trans-1,3- and 1,4-cyclohexanedimethanol (63.42 g, 0.3167 mole) and diglycidyl ether of cis-, trans-1,3- and 1,4-cyclohexanedimethanol (150.88 g, 0.5886 mole) in the indicated order. The reactor was additionally equipped as specified in Reference Example 1 above. Sodium hydroxide (360.0 g, 9.0 moles) dissolved in DI water (360 g) for the initial addition was added to a side arm vented addition funnel, sealed with a ground glass stopper, then attached to the reactor. Stirring commenced to give a 22° C. mixture followed by commencement of dropwise addition of the aqueous sodium hydroxide solution. The reaction mixture was allowed to self-heat to 40° C. during the aqueous sodium hydroxide addition time and then held at that temperature via cooling from the fans as needed. Thus, after 92 min, 43.2% of the aqueous sodium hydroxide was added causing the reaction temperature to first reach 39-40° C. and then remain at that temperature range for the remainder of the aqueous sodium hydroxide addition. Addition of the aqueous sodium hydroxide required a total of 222 min. After 15.8 hr of postreaction the temperature had declined to 27.5° C., stirring ceased, and the reactor contents allowed to settle. The organic layer was decanted from the reactor and processed as specified in Reference Example 1 above. GC analysis after normalization to remove solvents (acetonitrile and toluene) and unreacted epichlorohydrin revealed the presence of 2.91 area % light components, 2.15 area % unreacted cis-, trans-1,3- and 1,4-cyclohexanedimethanol; 36.05 area % monoglycidyl ethers, 0.17 area % of a pair of components associated with the diglycidyl ether peaks, 56.34 area % diglycidyl ethers, and 2.38 area % oligomers that were volatile under the conditions of the GC analysis.

The organic layer was reloaded into the reactor along with fresh benzyltriethylammonium chloride (21.81 g, 0.1915 mole). Sodium hydroxide (180 g, 4.5 moles) dissolved in DI water (180 g) was added to a side arm vented addition funnel, sealed with a ground glass stopper, then attached to the reactor. Stirring commenced to give a 24° C. mixture followed by commencement of dropwise addition of the aqueous sodium hydroxide solution. The reaction mixture was allowed to self-heat during the aqueous sodium hydroxide addition time. Thus, after 135 min 100% of the aqueous sodium hydroxide was added causing the reaction temperature to reach a maximum of 34.5° C. After 16.35 hr of postreaction the temperature had declined to 24° C., stiffing ceased, and the reactor contents allowed to settle. The organic layer was decanted from the reactor and processed as specified in Reference Example 1 above. GC analysis after normalization to remove solvents (acetonitrile and toluene) and unreacted epichlorohydrin revealed the presence of 6.73 area % light components, 0.29 area % unreacted cis-, trans-1,3- and 1,4-cyclohexanedimethanol; 12.95 area % monoglycidyl ethers, 0.29 area % of a pair of components associated with the diglycidyl ether peaks, 77.55 area % diglycidyl ethers, and 2.19 area % oligomers that were volatile under the conditions of the GC analysis.

B. Epoxy Resin Product Isolation

The aqueous layer from the reaction was processed as specified in Reference Example 1 above. Rotary evaporation of the filtrate using a maximum oil bath temperature of 100° C. to a final vacuum of 2.7 mm of Hg removed the bulk of the volatiles. A total of 964.46 g of light yellow colored, transparent liquid was recovered after completion of the rotary evaporation. GC analysis after normalization to remove solvent (acetonitrile) revealed the presence of 12.58 area % monoglycidyl ethers, 0.24 area % of a pair of components associated with the diglycidyl ether peaks, 83.12 area % diglycidyl ethers, and 4.06 area % oligomers that were volatile under the conditions of the GC analysis. Thus, GC analysis revealed that essentially all light boiling components, including residual epichlorohydrin, had been removed.

C. Fractional Vacuum Distillation

A portion (964.27 g) of the product from the rotary evaporation was processed as specified in Reference Example 1 above. The final distillation cuts sought to selectively remove diglycidyl ether, leaving the oligomeric product (283.86 g) in the distillation pot. GC analysis using a cyclohexanone internal standard revealed that the oligomers contained residual 7.67 wt % diglycidyl ether with the balance as the oligomers. After normalization to remove the peaks associated with acetonitrile solvent and the diglycidyl ether, the GC analysis demonstrated the following oligomeric components containing multiple isomers:

2.97 area % 2-propanol, 1-(oxiranylmethoxy)-3-[[3(or 4)-[(oxiranylmethoxy)methyl]cyclohexyl]methoxy]- and oxirane, 2-[[2-chloro-1-[[[3(or 4)-[(oxiranylmethoxy)methyl]cyclohexyl]methoxy]methyl]ethoxy]methyl]-

18.91 area % oxirane, 2-[[[3(or 4)[[2,3-bis(oxiranylmethoxy)propoxy]methyl]cyclohexyl]methoxy]methyl]-

2.31 area % cyclohexanemethanol, 3(or 4)-[[2-hydroxy-3-[[3(or 4)-[(oxiranylmethoxy)methyl]cyclohexyl]methoxy]propoxy]methyl]-

27.24 area % 2-propanol, 1,3-bis[[3(or 4)-[(oxiranylmethoxy)methyl]cyclohexyl]methoxy]-

48.57 area % oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy]methyl]-

Titration demonstrated an EEW of 198.1. I.C.I. cone and plate viscosity was 3316 cp.

Reference Example 3

Three Stage Synthesis of Epoxy Resin of cis-, trans-1,3- and 1,4-Cyclohexanedimethanol Epoxidation of cis-, trans-1,3- and 1,4-cyclohexanedimethanol (UNOXOL™ Diol) was performed using three stages of aqueous sodium hydroxide followed by fractional vacuum distillation to separate the constituents of the epoxy resin:

A. Epoxidation Reaction

A 5 L, 4 neck, glass, round bottom reactor was charged with UNOXOL™ Diol (432.63 g, 3.0 moles, 6.0 hydroxyl eq), epichlorohydrin (1110.24 g, 12.0 moles, 2:1 epichlorohydrin:UNOXOL™ Diol hydroxyl eq ratio), toluene (2.5 L), and benzyltriethylammonium chloride (43.62 g, 0.1915 mole) in the indicated order. The reactor was additionally equipped as specified in Reference Example 1 above. Sodium hydroxide (360.0 g, 9.0 moles) dissolved in DI water (360 g) for the initial addition was added to a side arm vented addition funnel, sealed with a ground glass stopper, then attached to the reactor. Stirring commenced to give a 21° C. mixture followed by commencement of dropwise addition of the aqueous sodium hydroxide solution. The reaction mixture was allowed to self-heat to 40° C. during the aqueous sodium hydroxide addition time and then held at that temperature via cooling from the fans as needed. Thus, after 55 min, 25% of the aqueous sodium hydroxide was added causing the reaction temperature to first reach 39-40° C. and then remain at that temperature range for the remainder of the aqueous sodium hydroxide addition. Addition of the aqueous sodium hydroxide required a total of 280 min. After 14.3 hr of postreaction the temperature had declined to 30° C., stiffing ceased, and the reactor contents allowed to settle. The organic layer was decanted from the reactor and processed as specified in Reference Example 1 above. GC analysis after normalization to remove solvents (acetonitrile and toluene) and unreacted epichlorohydrin revealed the presence of 2.44 area % light components, 2.79 area % unreacted cis-, trans-1,3- and 1,4-cyclohexanedimethanol; 39.77 area % monoglycidyl ethers, 0.12 area % of a pair of components associated with the diglycidyl ether peaks, 50.91 area % diglycidyl ethers, and 3.73 area % oligomers that were volatile under the conditions of the GC analysis.

The organic layer was reloaded into the reactor along with fresh benzyltriethylammonium chloride (21.81 g, 0.1915 mole). Sodium hydroxide (180 g, 4.5 moles) dissolved in DI water (180 g) was added to a side arm vented addition funnel, sealed with a ground glass stopper, then attached to the reactor. Stirring commenced to give a 23.5° C. mixture followed by commencement of dropwise addition of the aqueous sodium hydroxide solution. The reaction mixture was allowed to self-heat during the aqueous sodium hydroxide addition time. Thus, after 105 min 91.7% of the aqueous sodium hydroxide was added causing the reaction temperature to reach a maximum of 39° C. and then remain at that temperature range for the remainder of the aqueous sodium hydroxide addition. After 16.2 hr of postreaction the temperature had declined to 24° C., stirring ceased, and the reactor contents allowed to settle. The organic layer was decanted from the reactor and processed as specified in Reference Example 1 above. GC analysis after normalization to remove solvents (acetonitrile and toluene) and unreacted epichlorohydrin revealed the presence of 3.02 area % light components, 0.22 area % unreacted cis-, trans-1,3- and 1,4-cyclohexanedimethanol; 10.83 area % monoglycidyl ethers, 0.26 area % of a pair of components associated with the diglycidyl ether peaks, 79.56 area % diglycidyl ethers, and 5.96 area % oligomers that were volatile under the conditions of the GC analysis.

The organic layer was reloaded into the reactor along with fresh benzyltriethylammonium chloride (10.91 g, 0.0958 mole). Sodium hydroxide (90 g, 2.25 moles) dissolved in DI water (90 g) was added to a side arm vented addition funnel, sealed with a ground glass stopper, then attached to the reactor. Stirring commenced to give a 24° C. mixture followed by commencement of dropwise addition of the aqueous sodium hydroxide solution. The reaction mixture was allowed to self-heat during the aqueous sodium hydroxide addition time. Thus, after 25 min 37.5% of the aqueous sodium hydroxide was added causing the reaction temperature to reach a maximum of 25° C. and then remain at that temperature range for the remainder of the aqueous sodium hydroxide addition. After 17.0 hr of postreaction the temperature had declined to 23° C., stirring ceased, and the reactor contents allowed to settle. The organic layer was decanted from the reactor and processed as specified in Reference Example 1 above. GC analysis after normalization to remove solvents (acetonitrile and toluene) and unreacted epichlorohydrin revealed the presence of 4.28 area % light components, 0.03 area % unreacted cis-, trans-1,3- and 1,4-cyclohexanedimethanol; 4.93 area % monoglycidyl ethers, 0.28 area % of a pair of components associated with the diglycidyl ether peaks, 81.47 area % diglycidyl ethers, and 8.85 area % oligomers that were volatile under the conditions of the GC analysis.

B. Epoxy Resin Product Isolation

The aqueous layer from the reaction was processed as specified in Reference Example 1 above. Rotary evaporation of the filtrate using a maximum oil bath temperature of 100° C. to a final vacuum of 4.1 mm of Hg removed the bulk of the volatiles. A total of 742.92 g of light yellow colored, transparent liquid was recovered after completion of the rotary evaporation. GC analysis after normalization to remove solvent (acetonitrile) revealed the presence of 4.84 area % monoglycidyl ethers, 0.51 area % of a pair of components associated with the diglycidyl ether peaks, 88.00 area % diglycidyl ethers, and 6.61 area % oligomers that were volatile under the conditions of the GC analysis. Thus, GC analysis revealed that essentially all light boiling components, including residual epichlorohydrin, had been removed.

C. Fractional Vacuum Distillation/Water Washing

A portion (741.62 g) of the product from the rotary evaporation was processed as specified in Reference Example 1 above. The final distillation cuts sought to selectively remove diglycidyl ether, leaving the oligomeric product (238.98 g) in the distillation pot. The oligomeric product was dissolved in dichloromethane (250 mL) and then added to a separatory funnel and washed with DI water (100 mL). The organic solution recovered from the separatory funnel was dried over anhydrous sodium sulfate and filtered through a medium fritted glass funnel. Rotary evaporation of the filtrate using a maximum oil bath temperature of 100° C. to a final vacuum of 5.7 mm of Hg removed the dichloromethane. After cooling to 25° C., the oligomeric product was filtered over a bed of diatomaceous earth packed in a medium fritted glass funnel to provide a transparent, yellow liquid. GC analysis using a cyclohexanone internal standard revealed that the oligomers contained residual 6.60 wt % diglycidyl ether with the balance as the oligomers. After normalization to remove the peaks associated with acetonitrile solvent and the diglycidyl ether, the GC analysis demonstrated the following oligomeric components containing multiple isomers:

3.16 area % 2-propanol, 1-(oxiranylmethoxy)-3-[[3(or 4)-[(oxiranylmethoxy)methyl]cyclohexyl]methoxy]- and oxirane, 2-[[2-chloro-1-[[[3(or 4)-[(oxiranylmethoxy)methyl]cyclohexyl]methoxy]methyl]ethoxy]methyl]-

23.47 area % oxirane, 2-[[[3(or 4)[[2,3-bis(oxiranylmethoxy) propoxy]methyl]cyclohexyl]methoxy]methyl]-

0.27 area % cyclohexanemethanol, 3(or 4)-[[2-hydroxy-3-[[3 (or 4)-[(oxiranylmethoxy)methyl]cyclohexyl]methoxy] propoxy]methyl]-

12.56 area % 2-propanol, 1,3-bis[[3(or 4)-[(oxiranylmethoxy)methyl]cyclohexyl]methoxy]-

60.54 area % oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy] methyl]-

Titration demonstrated an EEW of 191.8.

Example 1

Preparation and Curing of Thermosettable Blends of the Polyfunctional Cycloaliphatic Epoxy Resins and Diethylenetriamine Part A.

A portion (10.56 g, 0.0536 epoxide eq) of the PACE resin from Reference Example 1 and DETA (1.11 g, 0.05379 N—H eq) were added to a glass bottle and vigorously stirred together. A portion (10.3 mg) of the homogeneous solution was removed for DSC analysis. An exotherm attributed to curing was observed with a 45.6° C. onset, 113.6° C. maximum, and a 201.4° C. endpoint accompanied by an enthalpy of 474.7 J/g. The cured product recovered from the DSC analysis was a transparent, light yellow colored, rigid solid.

Part B.

A portion (9.67 g, 0.04895 epoxide eq) of the PACE resin from Reference Example 2 and DETA (1.01 g, 0.0488 N—H eq) were added to a glass bottle and vigorously stirred together. A portion (10.3 mg) of the homogeneous solution was removed for DSC analysis. An exotherm attributed to curing was observed with a 45.6° C. onset, 113.6° C. maximum, and a 199.6° C. endpoint accompanied by an enthalpy of 466.9 J/g. The cured product recovered from the DSC analysis was a transparent, light yellow colored, rigid solid.

Example 2

Preparation of Clear, Unfilled Casting of Thermosettable Blends of the Polyfunctional Cycloaliphatic Epoxy Resins and Diethylenetriamine and Analysis of Glass Transition Temperature Part A.

The remaining portion of the PACE resin and DETA blend from Example 1A. was added to an aluminum dish and cured in an oven using the following schedule: 1 hr at 70° C., 1 hr at 100° C., 1 hr at 125° C., and 1 hr at 150° C. A portion (36.6 mg) of the transparent, light yellow colored casting was removed for DSC analysis. A Tg of 54° C. was observed, with no indication of further curing or exothermic decomposition observed up to the 250° C. DSC analysis temperature. A second scanning using the aforementioned conditions again revealed a 54° C. Tg.

Part B.

The remaining portion of the PACE resin and DETA blend from Example 1, Part B. was added to an aluminum dish and cured in an oven using the following schedule: 1 hr at 70° C., 1 hr at 100° C., 1 hr at 125° C., and 1 hr at 150° C. A portion (36.6 mg) of the transparent, light yellow colored casting was removed for DSC analysis. A Tg of 55° C. was observed, with no indication of further curing or exothermic decomposition observed up to the 250° C. DSC analysis temperature.

Example 3

Preparation and Curing of Thermosettable Blend of a Polyfunctional Cycloaliphatic Epoxy Resin and Triethylenetetramine A portion (11.74 g, 0.05926 epoxide eq) of the PACE resin from Reference Example 2 and TETA (1.45 g, 0.05943 N—H eq) were added to a glass bottle and vigorously stirred together. A portion (13.80 mg) of the homogeneous solution was removed for DSC analysis. An exotherm attributed to curing was observed with a 43.8° C. onset, 115.6° C. maximum, and a 200.2° C. endpoint accompanied by an enthalpy of 415.2 J/g. The cured product recovered from the DSC analysis was a transparent, light yellow colored, rigid solid.

Example 4

Preparation of Clear, Unfilled Casting of a Thermosettable Blend of a Polyfunctional Cycloaliphatic Epoxy Resin and Triethylenetetramine and Analysis of Glass Transition Temperature The remaining portion of the PACE resin and TETA blend from Example 3 was added to an aluminum dish and cured in an oven using the following schedule: 1 hr at 70° C., 1 hr at 100° C., 1 hr at 125° C., and 1 hr at 150° C. A portion (33.5 mg) of the transparent, light yellow colored casting was removed for DSC analysis. A Tg of 42° C. was observed, with no indication of further curing or exothermic decomposition observed up to the 250° C. DSC analysis temperature. The clear, unfilled casting was cut in half and then one half was additionally cured at 200° C. for 1 hr. A portion (36.2 mg) of the transparent, light yellow colored casting was removed for DSC analysis. A Tg of 45° C. was observed, with no indication of further curing or exothermic decomposition observed up to the 250° C. DSC analysis temperature.

Example 5

Preparation and Curing of Thermosettable Blend of a Polyfunctional Cycloaliphatic Epoxy Resin and Ethylenediamine A portion (12.67 g, 0.06395 epoxide eq) of the PACE resin from Reference Example 2 and EDA (0.96 g, 0.06392 N—H eq) were added to a glass bottle and vigorously stirred together. A portion (9.50 mg) of the homogeneous solution was removed for DSC analysis. An exotherm attributed to curing was observed with a 49.8° C. onset, 114.2° C. maximum, and a 191.3° C. endpoint accompanied by an enthalpy of 355.0 J/g. The cured product recovered from the DSC analysis was a transparent, light yellow colored, rigid solid.

Example 6

Preparation of Clear, Unfilled Casting of a Thermosettable Blend of a Polyfunctional Cycloaliphatic Epoxy Resin and Ethylenediamine and Analysis of Glass Transition Temperature The remaining portion of the PACE resin and EDA blend from Example 5 was added to an aluminum dish and cured in an oven using the following schedule: 1 hr at 70° C., 1 hr at 100° C., 1 hr at 125° C., and 1 hr at 150° C. A portion (35.9 mg) of the transparent, light yellow colored casting was removed for DSC analysis. A Tg of 52° C. was observed, with no indication of further curing or exothermic decomposition observed up to the 250° C. DSC analysis temperature. A second scanning using the aforementioned conditions again revealed a 52° C. Tg. A third scanning using the aforementioned conditions but with an increase to a 300° C. end temperature again revealed a 52° C. Tg. A fourth scanning using the conditions specified for the third scanning revealed a 51° C. Tg. There was no indication of further curing or exothermic decomposition observed up to the 250° C. (second scanning) or 300° C. (third and fourth scannings) DSC analysis temperatures.

Example 7

Preparation of Clear, Unfilled Casting of Thermosettable Blend of a Polyfunctional Cycloaliphatic Epoxy Resin and 4,4'-Diaminodiphenylmethane and Analysis of Glass Transition Temperature A portion (12.17 g, 0.0614 epoxide eq) of the PACE resin from Reference Example 2 and 4,4'-diaminodiphenylmethane (3.05 g, 0.0614 N—H eq) were added to an aluminum dish and cured in an oven using the following schedule: 1 hr at 100° C., 1 hr at 125° C. 1 hr at 150° C. and 1 hr at 200° C. A portion (33.6 mg) of the transparent, amber colored casting was removed for DSC. A Tg of 101° C. was observed, with no indication of further curing or exothermic decomposition observed up to the 250° C. DSC analysis temperature. A second scanning using the aforementioned conditions revealed a 100° C. Tg. A third scanning using the aforementioned conditions but with an increase to a 300° C. end temperature again revealed a 100° C. Tg. A fourth scanning using the conditions specified for the third scanning again revealed a 100° C. Tg. There was no indication of further curing or exothermic decomposition observed up to the 250° C. (second scanning) or 300° C. (third and fourth scannings) DSC analysis temperatures.

Comparative Example A

Preparation and Curing of a Thermosettable Blend of a High Purity Diglycidyl Ether of cis-, trans-1,3- and 1,4-Cyclohexanedimethanol and Diethylenetriamine A portion (5.0226 g, 0.03900 epoxide eq) of diglycidyl ether of UNOXOL™ Diol (cis-, trans-1,3- and 1,4-cyclohexanedimethanol) obtained from the fractional vacuum distillation of the epoxy resin of UNOXOL™ Diol from a three stage synthesis was added to a glass vial. GC analysis of the diglycidyl ether demonstrated 99.49 wt % diglycidyl ethers, 0.16 wt % monoglycidyl ethers, 0.35 wt. % of a pair of minor peaks associated with the diglycidyl ether peak and no detectable polyfunctional cycloaliphatic oligomers. DETA (0.81 g, 0.03926 N—H eq) was added to the glass vial and then the contents were vigorously stirred together. A portion (11.4 mg) of the homogeneous solution was removed for DSC analysis. An exotherm attributed to curing was observed with a 44.9° C. onset, 116.8° C. maximum, and a 203.8° C. endpoint accompanied by an enthalpy of 719.7 J/g. The cured product recovered from the DSC analysis was a transparent, light yellow colored, rigid solid.

Comparative Example B

Preparation of Clear, Unfilled Casting of Thermosettable Blends of High Purity Diglycidyl Ether of cis-, trans-1,3- and 1,4-Cyclohexanedimethanol and Diethylenetriamine and Analysis of Glass Transition Temperature The remaining portion of the diglycidyl ether of cis-, trans-1,3- and 1,4-cyclohexanedimethanol and DETA blend from Comparative Example A was added to an aluminum dish and cured in an oven using the following schedule: 1 hr at 70° C., 1 hr at 100° C., 1 hr at 125° C., and 1 hr at 150° C. The casting exhibited regions of deep channels or cracks which were first observed during the initial curing at 70° C. It is possible that the very high enthalpy on curing (Comparative Example A) may be responsible for the channels propagated through the casting. Two separate samples of the casting were randomly taken and analyzed by DSC (28.5 mg for Sample 1 and 32.4 mg for Sample 2). In the DSC analyses of both Samples 1 and 2, residual exothermicity was present in the first scanning, indicating incomplete cure (Tables IV and V, respectively). Upon second scanning the residual exothermicity was no longer detected in Sample 2, but was still present Sample 1, but in a slightly reduced amount. The large enthalpy associated with this curable mixture (Comparative Example A) may be responsible for the incomplete cure, with cure occurring so energetically that the mobility of amine groups and epoxide groups in the thermosetting matrix is restricted.

TABLE IV

Glass Transition Temperature for Diglycidyl Ether of cis-, trans-1,3- and 1,4-Cyclohexanedimethanol Cured with DETA: Sample 1

| Tg (° C.) | Onset of Residual Exothermicity (° C.) | Peak Exotherm (° C.) | End of Residual Exothermicity (° C.) | Enthalpy (J/g) |
|---|---|---|---|---|
| 64.9 | 151.9 | 175.9 | 239.0 | 5.6 |
| 65.5 (second scanning) | 157.0 | 179.3 | 224.8 | 4.7 |

TABLE V

Glass Transition Temperature for Diglycidyl Ether of cis-, trans-1,3- and 1,4-Cyclohexanedimethanol Cured with DETA: Sample 2

| Tg (° C.) | Onset of Residual Exothermicity (° C.) | Peak Exotherm (° C.) | End of Residual Exothermicity (° C.) | Enthalpy (J/g) |
|---|---|---|---|---|
| 62.9 | 155.8 | 180.6 | 241.4 | 3.6 |
| 62.4 (second scanning) | none detected | | | |

Comparative Example C

Analysis of Oligomer Structure Produced from Epoxidation of cis-, trans-1,4-Cyclohexanedimethanol Using Lewis Acid Catalyzed Coupling Structures proposed from GC-MS analysis of a sample of a commercial grade of an epoxy resin of cis-, trans-1,4-cyclohexanedimethanol (Erisys™ GE-22S) produced via epoxidation which employed Lewis acid catalyzed coupling are given, as follows:

Diglycidyl ether designated as H is the major product, comprising >80 area % of the combined oligomer product, F-J. There are no oligomer components in common with those of the PACE resin from the quaternary ammonium halide catalyzed route, for example as shown in Reference Examples 1C.-3C. Unlike the product produced from the quaternary ammonium halide catalyzed route, the product from the Lewis acid catalyzed route cannot be designated as "polyfunctional", since the highest functionality components are only diglycidyl ethers. Component G, a monoglycidyl ether monochlorohydrin, indicates that further treatment with aqueous sodium hydroxide is needed to complete the dehydrochlorination step in the epoxidation. Notably, components H-J all possess chlorine bound in the form of chloromethyl groups. The presence of this bound chloride most likely would preclude the use of this oligomer product for many applications including electronics and coatings used in contact with food.

TABLE VI

Cure Profile for PACE Resin Cured with Alkyleneamines

| Reference | Curing Agent | Onset to Cure (° C.) | Peak Exotherm (° C.) | End of Cure (° C.) | Enthalpy (J/g) |
|---|---|---|---|---|---|
| Example 5 | EDA | 49.8 | 114.2 | 191.3 | 355.0 |
| Example 1A. | DETA | 45.6 | 113.6 | 201.4 | 474.7 |
| Example 1B. | DETA | 45.6 | 113.6 | 199.6 | 466.9 |
| Example 3 | TETA | 43.8 | 115.6 | 200.2 | 415.2 |

TABLE VII

Glass Transition Temperature for PACE Resin Cured with Alkyleneamines

| Reference | Curing Agent | Tg (° C.) | Observations |
|---|---|---|---|
| Example 6 | EDA | 51.5 | 1 |
| Example 6 | EDA | 52.0 (second scanning) | |

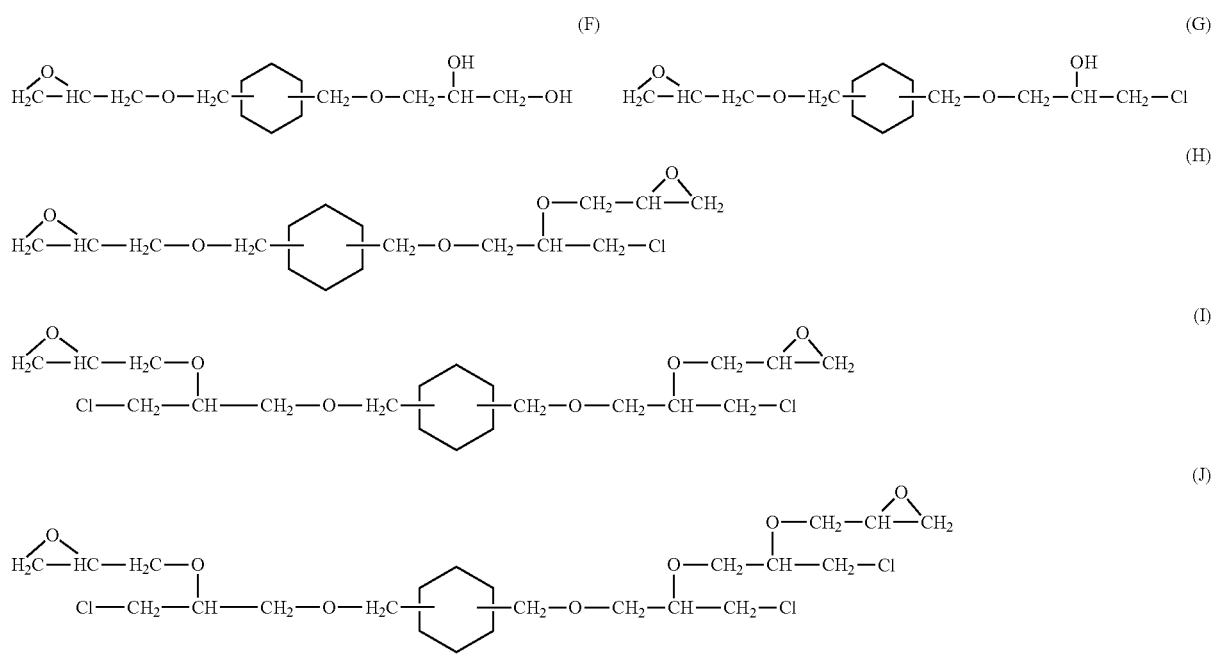

TABLE VII-continued

Glass Transition Temperature for PACE Resin Cured with Alkyleneamines

| Reference | Curing Agent | Tg (° C.) | Observations |
|---|---|---|---|
| Example 6 | EDA | 52.0 (third scanning) | |
| Example 6 | EDA | 51.0 (fourth scanning) | |
| Example 2A. | DETA | 54.1 | 1 |
| Example 2A. | DETA | 53.8 (second scanning) | 1 |
| Example 2B. | DETA | 54.9 | 1 |
| Example 4 | TETA | 41.7 (150° C. cure) | 1 |
| Example 4 | TETA | 45.1 (200° C. cure) | 1 |

[1] The product from curing was a rigid, transparent, light yellow colored casting with no visual observable flaws.

TABLE VIII

Cure Profile for Diglycidyl Ether of cis-, trans-1,3- and 1,4-Cyclohexanedimethanol Cured with DETA

| Reference | Curing Agent | Onset to Cure (° C.) | Peak Exotherm (° C.) | End of Cure (° C.) | Enthalpy (J/g) |
|---|---|---|---|---|---|
| Comparative Example A | DETA | 44.9 | 116.8 | 203.8 | 719.7 |

Example 8

Preparation and Curing of Thermosettable Blend of a Washed Polyfunctional Cycloaliphatic Epoxy Resin and Diethylenetriamine A portion (5.045 g, 0.0263 epoxide eq) of the washed PACE resin from Reference Example 3 and DETA (0.543 g, 0.0263 N—H eq) were added to a glass bottle and vigorously stirred together. A portion (17.7 mg) of the homogeneous solution was removed for DSC analysis. An exotherm attributed to curing was observed with a 33.7° C. onset, 113.5° C. maximum, and a 206.7° C. endpoint accompanied by an enthalpy of 487.0 J/g. The cured product recovered from the DSC analysis was a transparent, light yellow colored, rigid solid.

Example 9

Preparation of Clear, Unfilled Casting of a Thermosettable Blend of a Washed Polyfunctional Cycloaliphatic Epoxy Resin and Diethylenetriamine and Analysis of Glass Transition Temperature The remaining portion of the PACE resin and DETA blend from Example 8 was added to an aluminum dish and cured in an oven using the following schedule: 1 hr at 70° C., 1 hr at 100° C., 1 hr at 125° C., and 1 hr at 150° C. A portion (29.6 mg) of the transparent, light yellow colored casting was removed for DSC analysis. A Tg of 55.3° C. was observed, with no indication of further curing or exothermic decomposition observed up to the 250° C. DSC analysis temperature.

What is claimed is:

1. A thermosettable epoxy resin composition comprising
   (A) a residual oligomeric product; wherein the residual oligomeric product comprises a polyfunctional aliphatic or cycloaliphatic epoxy resin which has been isolated from an epoxy resin product formed as a result of an epoxidation process comprising the reaction of
      (i) an aliphatic or cycloaliphatic hydroxyl-containing material;
      (ii) an epihalohydrin;
      (iii) a basic-acting substance;
      (iv) a non-Lewis acid catalyst; and
      (v) optionally, one or more solvents;
   (B) an epoxy curing material comprising
      (i) an epoxy resin curing agent;
      (ii) an epoxy resin curing catalyst; or
      (iii) both (i) and (ii); and
   (C) optionally, an epoxy resin compound other than the polyfunctional aliphatic or cycloaliphatic epoxy resin (A).

2. The composition of claim 1 wherein the aliphatic or cycloaliphatic hydroxyl containing material is selected from the group consisting of cyclohexanedialkanols; cyclohexenedialkanols; cyclohexanolmonoalkanols; cyclohexenolmonoalkanols; decahydronaphthalenedialkanols; octahydronaphthalenedialkanols; 1,2,3,4-tetrahydronaphthalenedialkanols; and bridged cyclohexanols.

3. The composition of claim 2 wherein the aliphatic or cycloaliphatic hydroxyl containing material is selected from the group consisting of cyclohexanedialkanols and cyclohexenedialkanols.

4. The composition of claim 2 wherein the aliphatic or cycloaliphatic hydroxyl containing material is selected from the group consisting of cis-, trans-1,3- and 1,4-cyclohexanedimethanol; cis-, trans-1,2-cyclohexanedimethanol; cis-, trans-1,3-cyclohexanedimethanol; cis-, trans-1,4-cyclohexanedimethanol; a methyl substituted cyclohexanedimethanol; 1,1-cyclohexanedimethanol; a cyclohexenedimethanol; 3-cyclohexene-1,1-dimethanol, 6-methyl-; 4,6-dimethyl-3-cyclohexene-1,1-dimethanol; cyclohex-2-ene-1,1-dimethanol; 1,1-cyclohexanediethanol; 1,4-bis(2-hydroxyethoxy)cyclohexane; 1,4-cyclohexanediethanol; 1,4-(2-hydroxyethyloxy)cyclohexane; and 1,4-(2-hydroxyethyloxy)cyclohex-2-ene.

5. The composition of claim 1 wherein the cycloaliphatic hydroxyl containing material comprises a material selected from the group consisting of cycloaliphatic diols, polycycloaliphatic diols, monol monoalkanols and dialkanols.

6. The composition of claim 1 wherein the aliphatic hydroxyl containing material comprises a material selected from the group consisting of alkoxylated phenolic reactants; alkoxylation products of the hydrogenated aromatic phenolic reactants; neopentyl glycol; trimethylol propane; ethylene glycol; propylene glycol; triethylene glycol; higher alkoxylated ethylene glycols; pentaerythritol; 1,4-butanediol; 1,6-hexanediol; 1,12-dodecandiol; and mixtures thereof.

7. The composition of claim 1 wherein the polyfunctional aliphatic or cycloaliphatic epoxy resin of the residual oligomeric product has been isolated from diglycidyl ethers of cis-, trans-1,3- and 1,4-cyclohexanedimethanols; wherein the polyfunctional aliphatic or cycloaliphatic epoxy resin of the residual oligomeric product contains less than 20% by weight of diglycidyl ethers of cis-, trans-1,3- and 1,4-cyclohexanedimethanols and comprises one or more selected from the group consisting of:
   geometrical isomers of 2-propanol, 1-(oxiranylmethoxy)-3-[[3(or 4)-[(oxiranylmethoxy) methyl]cyclohexyl]methoxyl]-;
   geometrical isomers of oxirane, 2-[[2-chloro-1-[[[3(or 4)-[(oxiranylmethoxy)methyl]cyclohexyl]methoxy]methyl]ethoxy]methyl]-;

geometrical isomers of oxirane, 2-[[[3(or 4)-[[2,3-bis(oxiranylmethoxy)propoxy]methyl]cyclohexyl]methoxy]methyl]-;

geometrical isomers of cyclohexanemethanol, 3(or 4)-[[2-hydroxy-3-[[3(or 4)-[(oxiranyl-methoxy)methyl]cyclohexyl]methoxy]propoxy]methyl]-;

geometrical isomers of 2-propanol, 1,3-bis[[3(or 4)-[(oxiranylmethoxy)methyl] cyclohexyl]methoxy]-; and geometrical isomers of oxirane, 2-[[2-[[3(or 4)-[(oxiranyl-methoxy)methyl]cyclohexyl]methoxy]-1-[[[3(or 4)-[(oxiranylmethoxy)methyl]cyclohexyl]methoxy]methyl]ethoxy]methyl]-.

8. The composition of claim 1, wherein the curing material (B) comprises one or more alkyleneamine or polyalkylenepolyamine curing agents.

9. The composition of claim 1, including (C) one or more epoxy resins other than the epoxy resin of component (A).

10. The composition of claim 9, wherein the one or more epoxy resins, component (C), comprises one or more of aliphatic and/or cycloaliphatic epoxy resins.

11. A partially cured (B-staged) product comprising the partially cured thermosettable epoxy resin composition of claim 1.

12. A totally cured thermoset product comprising the totally cured thermosettable epoxy resin composition of claim 1.

13. An article made from the composition of claim 1.

14. The article of claim 13, wherein the article comprises a coating, a laminate, an encapsulation, a casting, a filament winding, a molding, a polymer concrete, an adhesive bond, a paint, a lacquer, a varnish, or a composite.

15. A process for preparing a thermosettable composition comprising admixing:
(A) a residual oligomeric product; wherein the residual oligomeric product comprises a polyfunctional aliphatic or cycloaliphatic epoxy resin which has been isolated from an epoxy resin product formed as a result of an epoxidation process comprising the reaction of
  (i) an aliphatic or cycloaliphatic hydroxyl-containing material;
  (ii) an epihalohydrin;
  (iii) a basic-acting substance;
  (iv) a non-Lewis acid catalyst; and
  (v) optionally, one or more solvents;
(B) an epoxy curing material comprising
  (i) an epoxy resin curing agent;
  (ii) an epoxy resin curing catalyst; or
  (iii) both (i) and (ii); and
(C) optionally, an epoxy resin compound other than the polyfunctional aliphatic or cycloaliphatic epoxy resin (A).

16. A process of curing an admixture composition comprising: preparing a thermosettable composition according to the method of claim 15, and curing the thermosettable composition at a temperature of from about 0° C. to about 300° C.

* * * * *